US012613490B2

(12) United States Patent
Shiina et al.

(10) Patent No.: US 12,613,490 B2
(45) Date of Patent: Apr. 28, 2026

(54) IMAGE FORMING APPARATUS WITH POSITIONING MECHANISM FOR DETECTION UNIT AND FOR CONTACT UNIT

(71) Applicant: CANON KABUSHIKI KAISHA, Tokyo (JP)

(72) Inventors: Sachiyori Shiina, Shizuoka (JP); Satoshi Koga, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/753,140

(22) Filed: Jun. 25, 2024

(65) Prior Publication Data

US 2025/0004415 A1 Jan. 2, 2025

(30) Foreign Application Priority Data

Jun. 29, 2023 (JP) ................................ 2023-107475

(51) Int. Cl.
*G03G 21/16* (2006.01)

(52) U.S. Cl.
CPC ..... *G03G 21/1647* (2013.01); *G03G 21/1633* (2013.01); *G03G 2221/1654* (2013.01); *G03G 2221/169* (2013.01)

(58) Field of Classification Search
CPC ........... G03G 21/1633; G03G 21/1647; G03G 2221/1654; G03G 2221/169
See application file for complete search history.

(56) References Cited

U.S. PATENT DOCUMENTS

| | | | |
|---|---|---|---|
| 8,224,196 B2 | 7/2012 | Oh | |
| 9,055,678 B2 | 6/2015 | Ujiie | |
| 2020/0409288 A1* | 12/2020 | Kumagai | G03G 15/55 |

FOREIGN PATENT DOCUMENTS

| | | | | |
|---|---|---|---|---|
| EP | 0915389 A2 * | 5/1999 | | G03G 15/0856 |
| JP | H09292816 A | 11/1997 | | |
| JP | 2004226932 A | 8/2004 | | |
| JP | 2013105149 A | 5/2013 | | |

* cited by examiner

*Primary Examiner* — Sophia S Chen
(74) *Attorney, Agent, or Firm* — ROSSI, KIMMS & McDOWELL LLP

(57) ABSTRACT

An image forming apparatus includes an apparatus body including an opening portion, and an attachable/detachable unit configured to be attached to and detached from the apparatus body through the opening portion. The apparatus body includes an opening/closing member, a detection unit configured to detect a state of the attachable/detachable unit, and an interlocking mechanism configured to move the detection unit in an interlocked manner with a movement of the opening/closing member. The attachable/detachable unit includes a positioning portion. The detection unit includes a positioned portion configured to be engaged with the positioning portion. The detection unit is configured to move to a first position in which the positioned portion is engaged with the positioning portion, and to a second position retracted from the first position in the first direction such that the positioned portion is disengaged from the positioning portion.

19 Claims, 14 Drawing Sheets

IMAGE FORMING APPARATUS WITH POSITIONING MECHANISM FOR DETECTION UNIT AND FOR CONTACT UNIT

BACKGROUND OF THE INVENTION

Field of the Invention

The present invention relates to image forming apparatuses for forming images on recording materials.

Description of the Related Art

Image forming apparatuses include an attachable/detachable unit, such as a process cartridge or a toner cartridge, that may be attached to and detached from an apparatus body. The specification of U.S. Pat. No. 8,224,196 describes a detection mechanism capable of detecting an amount of waste toner inside the waste toner container by adopting a configuration in which light emitted from a light emitting portion of the apparatus body is passed through an inner space of the waste toner container that is detachably attached to the apparatus body, and entered to the light receiving portion of the apparatus body.

SUMMARY OF THE INVENTION

The present invention provides a new technique related to an image forming apparatus having an attachable/detachable unit that is attached to and detached from an apparatus body.

According to one aspect of the invention, an image forming apparatus includes an apparatus body including an opening portion, and an attachable/detachable unit configured to be attached to and detached from the apparatus body through the opening portion, wherein the apparatus body includes (i) an opening/closing member configured to move to a closed position in which the opening/closing member closes the opening portion and to an opened position in which the opening/closing member opens the opening portion, (ii) a detection unit configured to detect a state of the attachable/detachable unit, the detection unit being disposed to face an end face of the attachable/detachable unit in a first direction in a state where the attachable/detachable unit is attached to the apparatus body, the first direction being a direction intersecting an attachment direction of the attachable/detachable unit to the apparatus body, and (iii) an interlocking mechanism configured to move the detection unit in an interlocked manner with a movement of the opening/closing member, wherein the attachable/detachable unit includes a positioning portion disposed on the end face, wherein the detection unit includes a positioned portion configured to be engaged with the positioning portion such that a position of the detection unit with respect to the attachable/detachable unit when viewed in the first direction is determined, wherein one of the positioned portion and the positioning portion is a projecting portion that is projected in the first direction, and the other of the positioned portion and the positioning portion is a first hole portion configured to be engaged with the projecting portion, wherein the detection unit is configured to move to a first position in which the positioned portion is engaged with the positioning portion, and to a second position retracted from the first position in the first direction such that the positioned portion is disengaged from the positioning portion, and wherein the interlocking mechanism is configured to move the detection unit from the first position to the second position in a case where the opening/closing member is moved from the closed position to the opened position, and move the detection unit from the second position to the first position in a case where the opening/closing member is moved from the opened position to the closed position.

According to another aspect of the invention, an image forming apparatus includes an apparatus body including an opening portion, and an attachable/detachable unit configured to be attached to and detached from the apparatus body through the opening portion, the attachable/detachable unit including a storage medium configured to store information related to the attachable/detachable unit, wherein the apparatus body includes (i) an opening/closing member configured to move to a closed position in which the opening/closing member closes the opening portion and to an opened position in which the opening/closing member opens the opening portion, (ii) a control unit configured to acquire information from the storage medium, (iii) a contact unit configured to electrically connect the control unit and the storage medium in a state where the attachable/detachable unit is attached to the apparatus body, the contact unit being disposed to face an end face of the attachable/detachable unit in a first direction in a state where the attachable/detachable unit is attached to the apparatus body, the first direction being a direction intersecting an attachment direction of the attachable/detachable unit to the apparatus body, and (iv) an interlocking mechanism configured to move the contact unit in an interlocked manner with a movement of the opening/closing member, wherein the attachable/detachable unit includes a positioning portion disposed on the end face, wherein the contact unit includes a positioned portion that is configured to be engaged with the positioning portion such that a position of the contact unit with respect to the attachable/detachable unit when viewed in the first direction is determined, wherein one of the positioned portion and the positioning portion is a projecting portion that is projected in the first direction, and the other of the positioned portion and the positioning portion is a first hole portion configured to be engaged with the projecting portion, wherein the contact unit is configured to move to a first position in which the positioned portion is engaged with the positioning portion, and to a second position retracted from the first position in the first direction such that the positioned portion is disengaged from the positioning portion, and wherein the interlocking mechanism is configured to move the contact unit from the first position to the second position in a case where the opening/closing member is moved from the closed position to the opened position, and to move the contact unit from the second position to the first position in a case where the opening/closing member is moved from the opened position to the closed position.

Further features of the present invention will become apparent from the following description of exemplary embodiments with reference to the attached drawings.

DESCRIPTION OF THE EMBODIMENTS

Hereafter, embodiments according to a present disclosure will be described with reference to the drawings.

First Embodiment

Figure 1:
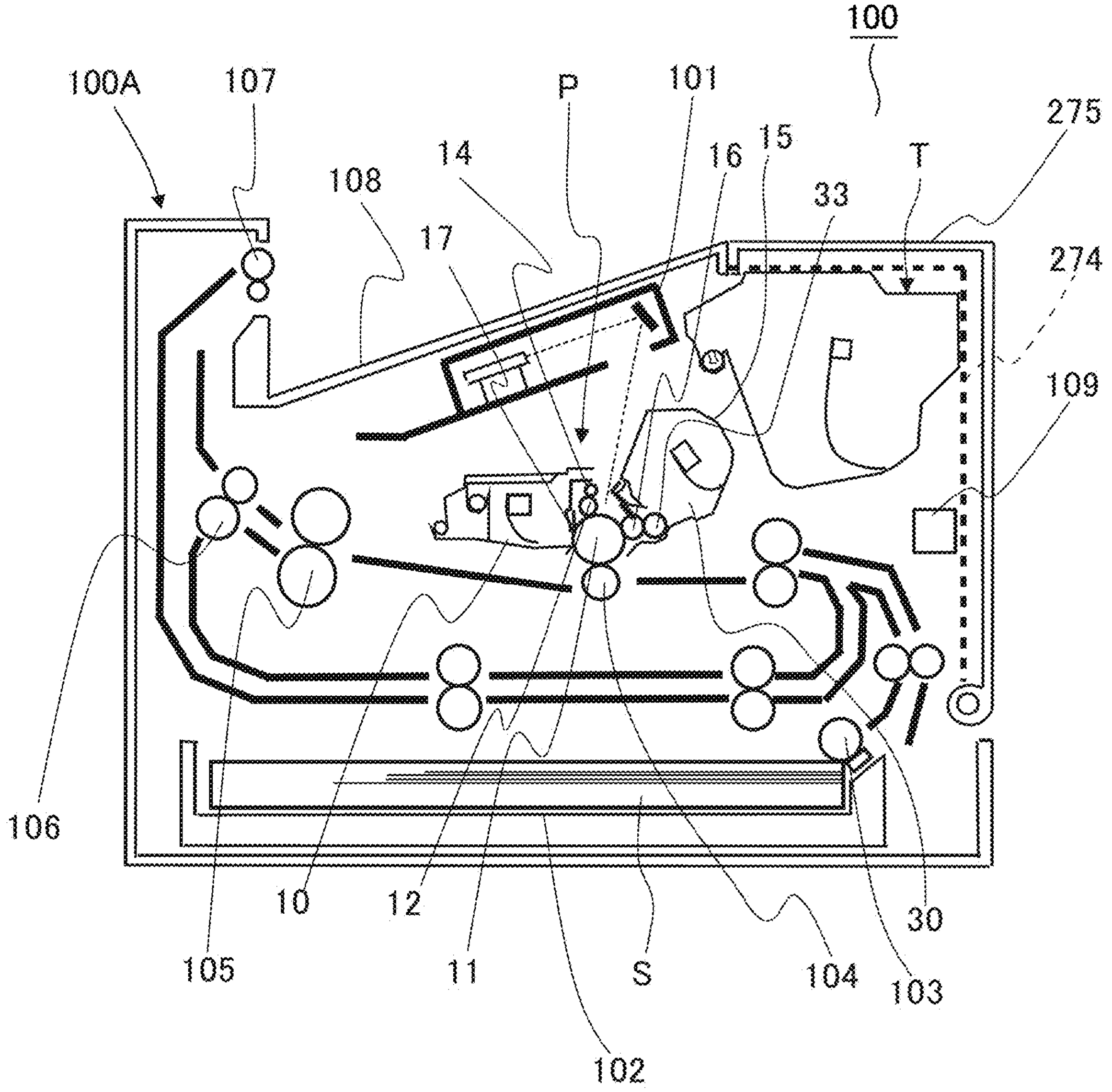
FIG. 1 is a schematic drawing of an image forming apparatus according to a first embodiment.

FIG. 1 is a schematic drawing illustrating an image forming apparatus 100 serving as an example of an image forming apparatus according to a first embodiment. The image forming apparatus 100 is a monochrome laser beam printer that forms a monochrome image on a recording material by an electrophotographic process. Various types of sheet materials of different sizes and materials may be used as a sheet S serving as a recording material, or recording medium, including paper such as normal paper and thick paper, a sheet material subjected to surface treatment such as coated paper, a sheet material having a special shape such as an envelope or an index paper, plastic films, and cloths.

As illustrated in FIG. 1, the image forming apparatus 100 includes an apparatus body 100A, a process cartridge P, and a toner cartridge T. The apparatus body 100A is an image forming apparatus body, i.e., apparatus body, of the image forming apparatus 100. The process cartridge P and the toner cartridge T are each an attachable/detachable unit that may be attached to and detached from the apparatus body 100A. In the present embodiment, the apparatus body 100A illustrates a portion of the image forming apparatus 100 having excluded the process cartridge P and the toner cartridge T.

The apparatus body 100A includes a feed roller 103 serving as a sheet feed unit, a transfer roller 104 serving as a transfer unit, a fixing unit 105 serving as a fixing unit, a laser scanner 101 serving as an exposing unit, a discharge roller pair 107 serving as a discharge unit, and a control unit 109. Further, a feed tray 102 on which sheets S serving as recording material are placed is disposed on a lower portion of the apparatus body 100A. A discharge tray 108 on which sheets S having images formed thereon are placed is disposed on an upper side of the apparatus body 100A.

Further, the apparatus body 100A includes an opening portion 274 for attaching and detaching the process cartridge P and the toner cartridge T, and a door 275 for opening and closing the opening portion 274. The door 275 is an opening/closing member that may be moved to a closed position for closing the opening portion 274 and an opened position for opening the opening portion 274 by pivoting about a hinge portion. After moving the door 275 from the closed position to the opened position, the user may insert or remove the process cartridge P and the toner cartridge T through the opening portion 274 to attach or detach the same.

The process cartridge P and the transfer roller 104 are an example of an image forming portion for forming an image on a recording material. The process cartridge P includes a cleaning unit 10 equipped with a photosensitive drum 11 serving as an image bearing member, and a developing unit 15. The cleaning unit 10 includes the photosensitive drum 11, a cleaning blade 17 serving as a cleaning member of the photosensitive drum 11, a charging roller 12 serving as a charging member, and a charging cleaner 14 serving as a cleaning member of the charging roller 12. The developing unit 15 includes a developing roller 16 serving as a developer bearing member, a feed roller 33, a toner supply unit 30 for storing toner serving as a developer and supplying the same to the developing roller 16 and the feed roller 33, and a waste toner storage unit 40 described later. The toner cartridge T will be described below.

An image forming operation of the image forming apparatus 100 will be described. When an instruction to execute an image forming operation is received together with an image data from an external computer, the image forming apparatus 100 starts the image forming operation. At first, the photosensitive drum 11 is driven to rotate by a driving source of the apparatus body 100A. The charging roller 12 charges a surface of the photosensitive drum 11 uniformly to a predetermined potential. The laser scanner 101 irradiates the photosensitive drum 11 with laser light based on the image data and exposes the surface, and then removes a surface charge of the exposed portion from the photosensitive drum 11 to thereby form an electrostatic latent image. The developing roller 16 supplies toner to the photosensitive drum 11, and develops the electrostatic latent image into a toner image. The toner image is conveyed to a transfer portion formed between the photosensitive drum 11 and the transfer roller 104 in a state being borne on the photosensitive drum 11.

In parallel with the forming of the toner image described above, sheets S are fed one by one to the transfer portion. Specifically, the feed roller 103 rotates and feeds the uppermost sheet S on the feed tray 102. The sheet S being fed is conveyed to the transfer portion at a matched timing with the arrival of the toner image formed on the photosensitive drum 11 to the transfer portion. By having a transfer voltage applied to the transfer roller 104, the toner image is transferred from the photosensitive drum 11 to the sheet S while the sheet S passes through the transfer portion.

The sheet S having the toner image transferred thereto is conveyed to the fixing unit 105. The fixing unit 105 includes a roller pair that nips and conveys the sheet S, and a heat source such as a halogen lamp, and heats and presses the toner image on the sheet S while nipping and conveying the sheet S. Thereby, an image fixed to the sheet S may be obtained. The sheet S having passed through the fixing unit 105 is discharged to the exterior of the apparatus body 100A via a conveyance roller pair 106 by the discharge roller pair 107, and supported on the discharge tray 108.

When forming images on both sides of the sheet S, a reverse conveyance, or switchback, of the sheet S on which an image has been formed on a first surface is performed, and the sheet S is conveyed again to the transfer portion through a reconveyance path. Then, after having a toner image transferred to a second surface and after being subjected to heating and pressing at the fixing unit 105, the sheet S is discharged onto the discharge tray 108.

The control unit 109 is an example of a controller, or control circuit, that controls the image forming apparatus 100. The control unit 109 includes a CPU that executes programs, and a storage unit that stores programs and data necessary for controlling the image forming apparatus 100 and that also provides a work space for the CPU. By the CPU reading and executing the program from the storage unit, the control unit 109 controls the operation of the image forming apparatus 100. For example, when the control unit 109 detects a full state of the waste toner storage unit 40 of the toner cartridge T based on a detection signal of a detection unit 199 described below, an information urging the user to exchange the toner cartridge T is notified to the user. The notification method is not specifically limited, but for example, methods may be adopted to display an image or a text information on a display unit or an operation panel equipped to the apparatus body 100A, or to transmit a predetermined signal to an external computer connected to the image forming apparatus 100 through a network.

Cartridge

Figure 2:
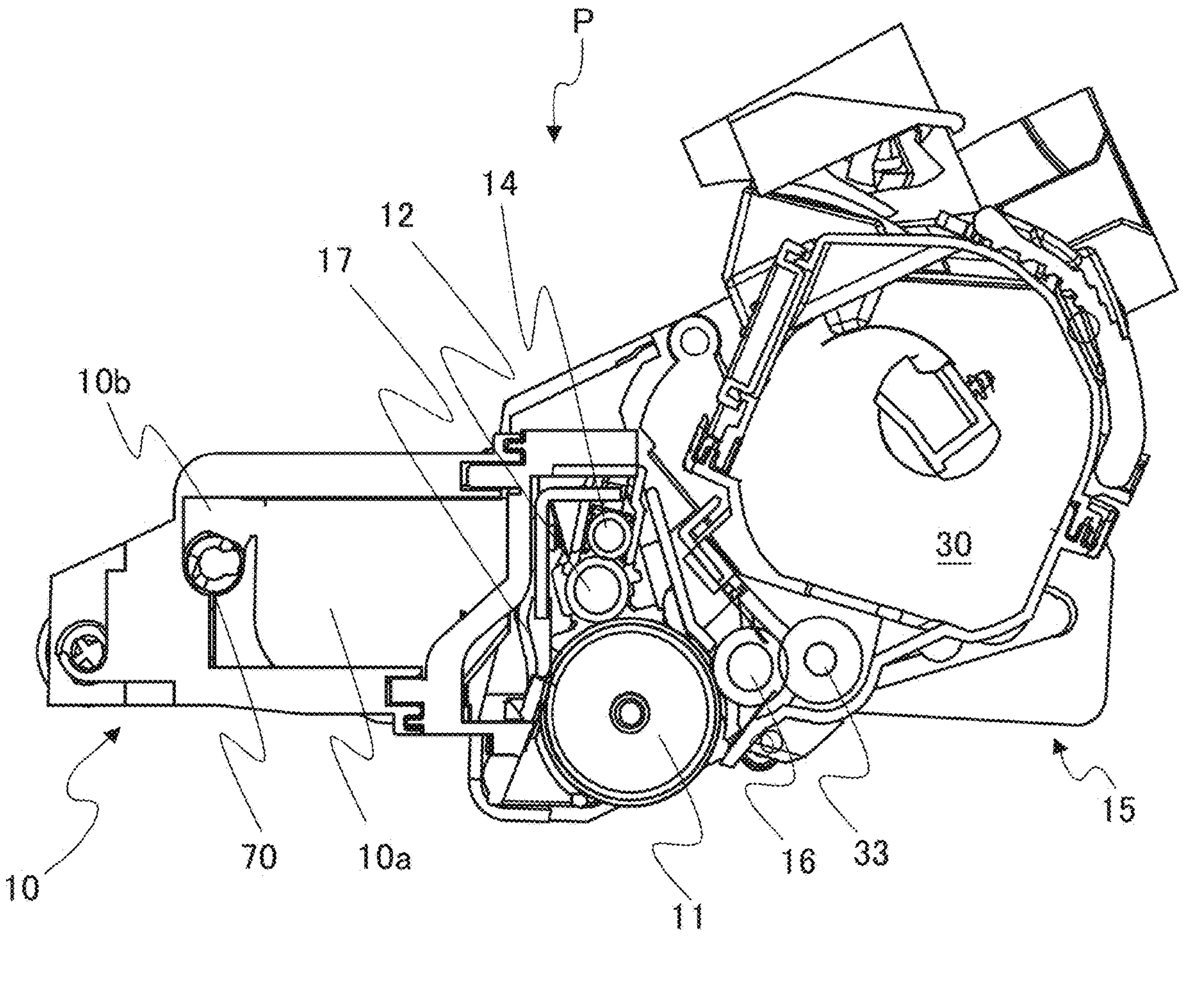
FIG. 2 is a cross-sectional view of a process cartridge according to the first embodiment.

The process cartridge P will be described with reference to FIG. 2. FIG. 2 is a cross-sectional view illustrating the process cartridge P cut at a plane perpendicular to a rotational axis of the photosensitive drum 11. Hereafter, the rotational axis direction of the photosensitive drum 11 is denoted as a longitudinal direction of the process cartridge P and the toner cartridge T.

As described above, the process cartridge P includes the cleaning unit 10 and the developing unit 15. The cleaning unit 10 includes, in addition to the photosensitive drum 11, the charging roller 12, the charging cleaner 14, and the cleaning blade 17, a primary storage portion 10*a*, a waste toner conveyance path 10*b*, and a conveyance screw 70.

The cleaning blade 17 is an elastic member disposed such that a tip thereof comes into contact with the photosensitive drum 11 with a predetermined contact pressure. The cleaning blade 17 removes foreign substances such as transfer residual toner remaining on the surface of the photosensitive drum 11 without being transferred to the sheet S at the transfer portion from the photosensitive drum 11. The foreign substances removed by the cleaning blade 17 is hereinafter referred to as "waste toner". After being stored temporarily in a primary storage portion, waste toner is conveyed by the conveyance screw 70 through the waste toner conveyance path 10*b* toward the waste toner storage unit 40 of the toner cartridge T described below.

Toner Cartridge

Figure 3:
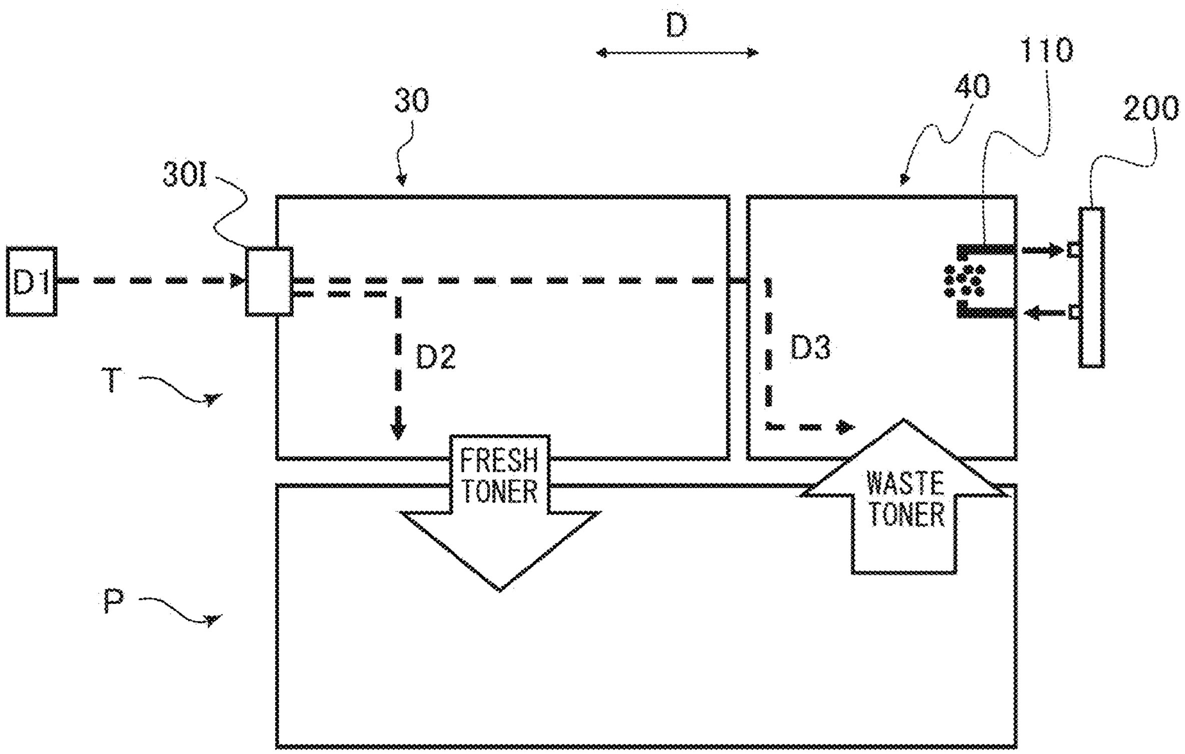
FIG. 3 is a schematic drawing of the process cartridge and a toner cartridge according to the first embodiment.

Next, the toner cartridge T will be described. FIG. 3 is a schematic drawing illustrating a functional relationship between the process cartridge P and the toner cartridge T.

As illustrated in FIG. 3, the toner cartridge T includes the toner supply unit 30 for supplying toner to the process cartridge P, and the waste toner storage unit 40 for collecting waste toner from the process cartridge P. Hereafter, the toner stored in the toner supply unit 30, i.e., toner to be replenished to the process cartridge P, is referred to as "fresh toner".

The toner supply unit 30 and the waste toner storage unit 40 are arranged side by side in a longitudinal direction D. In other words, the toner supply unit 30 and the waste toner storage unit 40 are in a positional relationship at least partially overlapped with each other when viewed in the longitudinal direction.

The toner supply unit 30 includes a drive input unit 30I to which driving force is entered from a driving source D1 of the apparatus body 100A. The drive input unit 30I is disposed on one end side of the toner supply unit 30 in the longitudinal direction D. The drive input unit 30I is, for example, a gear that meshes with a gear on the apparatus body 100A side, or a coupling that meshes with a coupling on the apparatus body 100A side. By attaching the toner cartridge T to the apparatus body 100A, the drive input unit 30I may receive the driving force from the driving source D1.

The driving force entered to the drive input unit 30I is branched and transmitted to a first transmission passage D2 and a second transmission passage D3. The first transmission passage D2 is a drive transmission path for conveying fresh toner within the toner supply unit 30 and discharging fresh toner from the toner supply unit 30 toward the process cartridge P. A conveyance screw for conveying fresh toner toward the discharge port of the toner supply unit 30 is arranged in the first transmission passage D2.

The second transmission passage D3 is a drive transmission path that transmits a portion of a driving force entered to one end side of the toner supply unit 30 in the longitudinal direction D to the other end side thereof in the longitudinal direction D, and further transmits the same to the waste toner storage unit 40. As described later, the waste toner storage unit 40 uses the drive force transmitted via the second transmission passage D3 to convey waste toner collected from the process cartridge P on the inner side of the waste toner storage unit 40.

Further, the waste toner storage unit 40 includes a light guide member 110. The light guide member 110 constitutes an amount of waste toner detection mechanism adopting a light transmission system together with the detection unit 199 described later disposed on the apparatus body 100A. The light guide member 110 forms an optical path, i.e., space optical path, that passes through an inner space of the waste toner storage unit 40. When the toner cartridge T is attached to the apparatus body 100A, the detection unit 199 is used to detect the state of the toner cartridge T. The detection unit 199 according to the present embodiment is capable of detecting a full state, i.e., a state where an amount of waste toner equal to or exceeding a threshold amount set in advance is stored, of the waste toner storage unit 40 by an optical detection mechanism.

Figure 4:
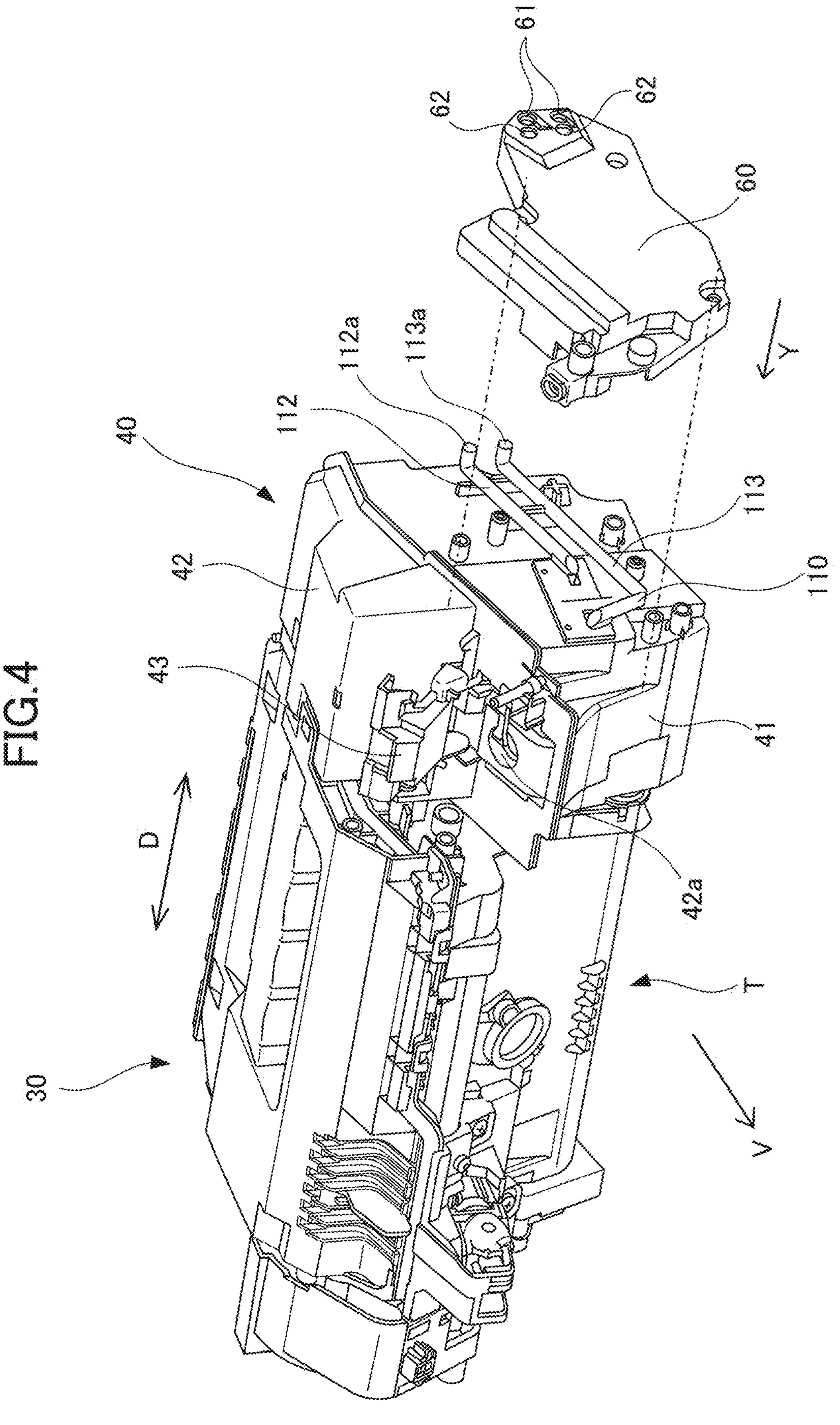
FIG. 4 is a perspective view of the toner cartridge according to the first embodiment.

The waste toner storage unit 40 will be described in detail with reference to FIG. 4. FIG. 4 is a perspective view illustrating the toner cartridge T from the waste toner storage unit 40 side.

The waste toner storage unit 40 includes a storage portion body 41, a storage portion lid 42, the light guide member 110, and a side cover 60. The storage portion lid 42 covers an opening at an upper portion of the storage portion body 41. The storage portion body 41 and the storage portion lid 42 form a storage portion, i.e., storage frame body or waste toner container, storing waste toner.

The storage portion lid 42 is provided with an inlet port 42*a* through which waste toner from the process cartridge P may enter the storage portion. Further, the storage portion lid 42 has an opening/closing member 43 attached thereto that closes the inlet port 42*a* when the toner cartridge Tis not attached to the apparatus body 100A.

The side cover 60 is attached to a side surface in the longitudinal direction D of the storage portion. The side cover 60 forms at least a part of the side surface of the toner cartridge T serving as an end face of the toner cartridge T in a direction, i.e., longitudinal direction D, that intersects an attachment direction V of the toner cartridge T. The side cover 60 is arranged at an opposite side as the toner supply unit 30 in the longitudinal direction D with respect to the storage portion. In FIG. 4, the side cover 60 is illustrated in a state separated from the storage portion in the longitudinal direction D so as to make the light guide member 110 visible.

The light guide member 110 is attached between the storage portion body 41 and the side cover 60. The light guide member 110 includes a first light guide body 112 and a second light guide body 113. The first light guide body 112 includes an incident portion 112*a* into which light from the light emitting portion of the apparatus body 100A enters, and an emitting portion protruded into the storage portion. The second light guide body 113 includes an incident portion that is protruded into the storage portion and that faces the emitting portion of the first light guide body 112 with the spatial optical path interposed therebetween, and an emitting portion 113*a* through which light is emitted toward the light receiving portion of the apparatus body 100A.

The side cover 60 is a cover member having two openings 62 formed thereto, which respectively fit to the incident portion 112*a* of the first light guide body 112 and the emitting portion 113*a* of the second light guide body 113. The openings 62 are each a hole that passes through the side cover 60 in the longitudinal direction D. One of the openings 62 may be referred to as a first opening to which the first light guide body 112 is inserted, and the other of the openings 62 may be referred to as a second opening to which the second light guide body 113 is inserted. In a state where the side cover 60 is attached to the storage portion, i.e., in a product state, the light guide member 110 excluding the incident portion 112*a* and the emitting portion 113*a* is in a state covered by the side cover 60.

Further, at least one positioning hole 61 is formed on an end face at a −Y direction side of the side cover 60. According to the present embodiment, two positioning holes 61 are provided. The positioning holes 61 are opened toward a direction, i.e., first direction, intersecting the attachment direction V of the toner cartridge T. The positioning holes 61 are each a hole that is formed on the side cover 60 in the longitudinal direction D, or a concave portion that is concaved from an outer side surface, i.e., surface opposite to the storage portion, of the side cover 60 toward the inner side, i.e., storage portion side. The positioning holes 61 are preferably arranged near the openings 62 that fit to the incident portion 112*a* and the emitting portion 113*a* of the light guide member 110.

The detection unit 199 described below is arranged to face the side cover 60 of the toner cartridge T. That is, in a state where the toner cartridge T is attached to the apparatus body 100A, the detection unit 199 is arranged to face a side surface of the toner cartridge T in the first direction, i.e., Y direction, intersecting the attachment direction V of the toner cartridge T.

The positioning holes 61 are an example of a positioning portion that positions the detection unit 199 described below with respect to the toner cartridge T in a state where the toner cartridge T is attached to the apparatus body 100A. The positioning holes 61 according to the present embodiment are holes, i.e., first hole portion or fitting portions, to which positioning bosses 201*s*, i.e., projecting portion, of the detection unit 199 described below are fitted in a state where the toner cartridge T is attached to the apparatus body 100A. By fitting the positioning bosses 201*s* to the positioning holes 61, the detection unit 199 on the apparatus body 100A side may be positioned with respect to the toner cartridge T.

The state in which the positioning portion is fit to the positioned portion is not limited to a strict fitting in which the shapes of outer edges of the projecting portions correspond to shapes of the inner edges of the hole portion when viewed in the direction of projection of the projecting portion, but should merely achieve an appropriate positioning accuracy according to the specific configuration of the detection unit 199.

Detection Unit

The apparatus body 100A is equipped with the detection unit 199 serving as a detection unit, i.e., waste toner full detection unit, constituting an amount of waste toner detection mechanism together with the light guide member 110 of the toner cartridge T. The detection unit 199 includes the detection unit 199. Further, the detection unit 199 is arranged in the apparatus body 100A as a detection unit assembly 198 that is assembled with a base holder 203 that supports the detection unit 199 and a swing lever 202. The detection unit 199, i.e., the detection unit assembly 198, is an interface unit disposed on the apparatus body 100A side corresponding to the toner cartridge T in the amount of waste toner detection mechanism.

Figure 5:
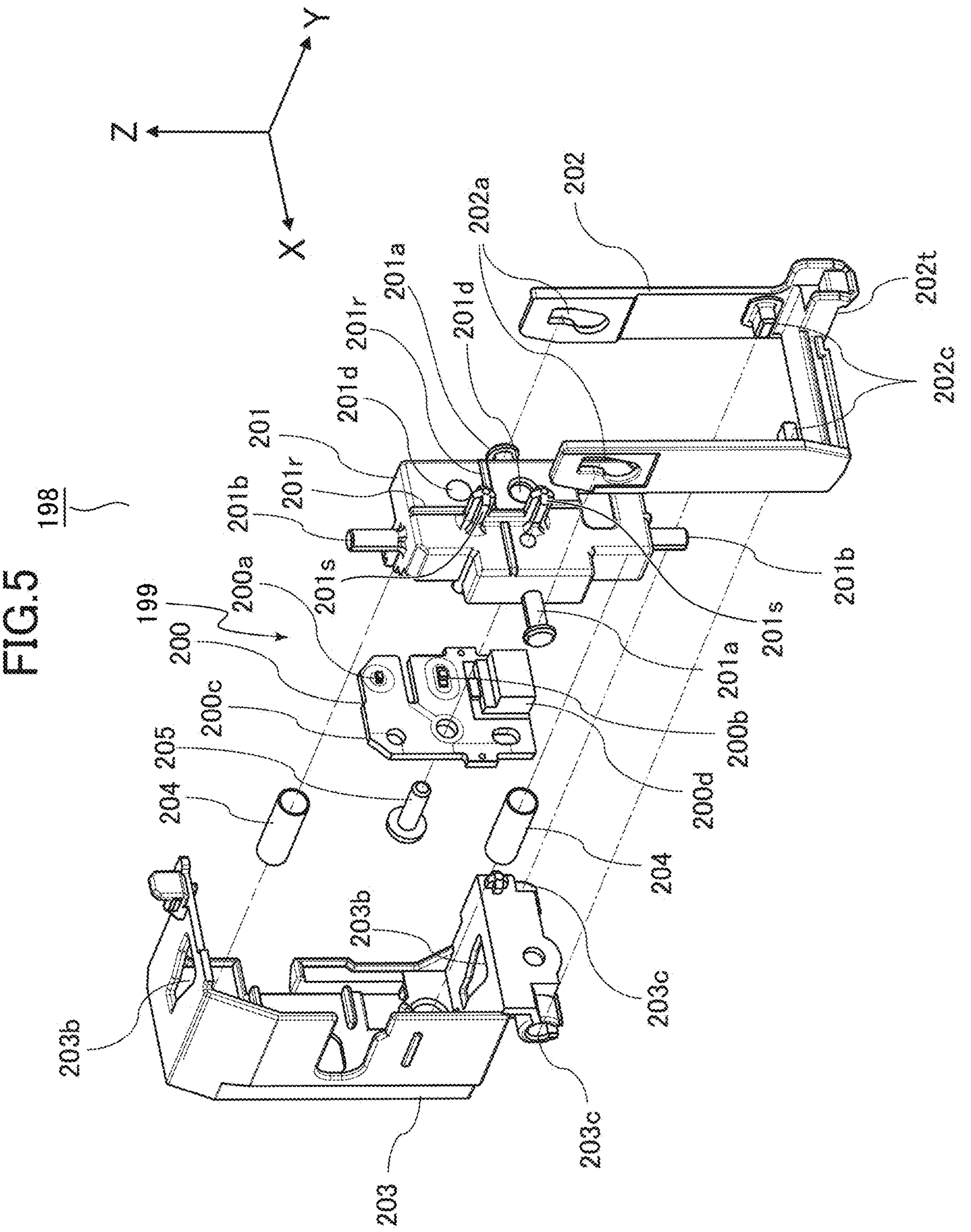
FIG. 5 is an exploded view of a detection unit assembly according to the first embodiment.

The detection unit assembly 198 according to the first embodiment will be described below. At first, components of the detection unit assembly 198 will be described with reference to FIG. 5. FIG. 5 is an exploded view of the detection unit assembly 198.

The detection unit assembly 198 includes a sensor substrate 200, a substrate holder 201, the swing lever 202, the base holder 203, and compression springs 204.

The sensor substrate 200 includes a light emitting portion 200*a*, i.e., light emitting element, a light receiving portion 200*b*, i.e., light receiving element, and an insulating substrate 200*c*. An example of the light emitting portion 200*a* is a light emitting diode (LED), and an example of the light receiving portion 200*b* is a phototransistor, but are not limited thereto. The light emitting portion 200*a* and the light receiving portion 200*b* are attached to the insulating substrate 200*c*. Further, the sensor substrate 200 includes a connector 200*d* that connects the sensor substrate 200 to an electric wiring of the apparatus body 100A. The sensor substrate 200 is electrically connected to the control unit 109 of the image forming apparatus 100 via a wiring connected to the connector 200*d*.

In the present embodiment, a direction perpendicularly intersecting the sensor substrate 200, i.e., a normal direction of a mounting surface of the light emitting portion 200*a* and the light receiving portion 200*b* on the insulating substrate 200*c*, is referred to as a +Y direction. One direction orthogonal to the +Y direction is referred to as a +X direction. A direction orthogonal to both the +X direction and the +Y direction is referred to as a +Z direction. Further, the directions opposite to each of the +X direction, the +Y direction, and the +Z direction which are illustrated by arrows X, Y, and Z in the drawing are referred to as a −X direction, a −Y direction, and a −Z direction. Further, the +X direction and the −X direction are collectively referred to as the X direction, the +Y direction and the −Y direction are collectively referred to as the Y direction, and the +Z direction and the −Z direction are collectively referred to as the Z direction. In the present embodiment, the X direction is approximately parallel to the longitudinal direction D of the process cartridge P and the toner cartridge T described above. Further, the Z direction according to the present embodiment is a direction along a gravity direction.

The light emitting portion 200*a* and the light receiving portion 200*b* according to the present embodiment are attached to a main surface in the +Y direction of the insulating substrate 200*c* that is plate shaped and that extends in the X and Z directions. The optical axis direction of light emitted by the light emitting portion 200*a* according to the present embodiment is the +Y direction. That is, the optical axis direction of the light emitting portion 200*a* is approximately parallel to the direction of projection, i.e., +Y direction, of the plurality of positioning bosses 201*s* described below, excluding inevitable errors caused by manufacture tolerances. Further, the light receiving portion 200*b* according to the present embodiment is aligned in the −Z direction with the light emitting portion 200*a*.

The substrate holder 201 is a holding member that holds the sensor substrate 200. The sensor substrate 200 is fixed to the substrate holder 201 by a screw 205, or by other fixing methods such as an adhesive. The sensor substrate 200 and the substrate holder 201 move integrally in the X, Y, and Z directions.

The substrate holder 201 includes at least one positioning boss 201*s* that protrudes in the +Y direction, at least one first boss 201*a* that protrudes in the X direction, at least one second boss 201*b* that protrudes in the Z direction, and an optical path hole 201*d*. The substrate holder 201 according to the present embodiment includes two positioning bosses 201*s*, two first bosses 201*a*, two second bosses 201*b*, and two optical path holes 201*d*.

The positioning bosses 201*s* have positioning shapes for positioning the sensor substrate 200 with respect to the toner cartridge T when the toner cartridge T is attached to the apparatus body 100A. The positioning bosses 201*s* are an example of a positioned portion that is fit to a positioning portion, i.e., the positioning holes 61, such that the position of the detection unit 199 viewed in the first direction is determined with respect to the toner cartridge T serving as the attachable/detachable unit. The positioning bosses 201*s* according to the present embodiment are protruded in the +Y direction from the end face in the +Y direction of the substrate holder 201.

That is, according to the present embodiment, the positioned portion is a shape that protrudes to a first side in the first direction, i.e., Y direction. The first side refers to a side, i.e., +Y direction side, from the detection unit 199 toward the side surface of the toner cartridge T in the first direction, i.e., Y direction, and a second side refers to a side, i.e., −Y direction side, that is opposite to the first side in the first direction, i.e., Y direction. The positioning bosses 201*s* are an example of a projecting portion that is projected toward the side, i.e., +Y direction, opposite to the direction in which the positioning holes 61 are opened, i.e., −Y direction. By having the positioning bosses 201*s* serving as the projecting portion fit to the positioning holes 61 serving as the hole portion, the detection unit 199 is positioned with respect to the toner cartridge T.

The positioning bosses 201*s* are preferably arranged near the optical path holes 201*d*. What is meant by being arranged near the optical path holes 201*d* is that at least a portion of the positioning bosses 201*s* is overlapped with the sensor substrate 200 when viewed in the Y direction. Further, by arranging a plurality of positioning bosses 201*s*, it becomes possible to suppress the misalignment of the sensor substrate 200 in the rotational direction about the positioning bosses 201*s* in the attached state of the toner cartridge T, compared to the case where only one positioning boss 201*s* is arranged.

The detection unit 199 composed of the sensor substrate 200 and the substrate holder 201 may be moved to a detectable position that is positioned on the +Y direction side and a retracting position that is retracted to the −Y direction side from the detectable position. The detectable position is a position, i.e., first position, in which the positioning bosses 201*s* serving as the positioned portion are fit to the positioning holes 61 (FIG. 4) serving as the positioning portion. The retracting position is a position, i.e., second position, in which the positioning bosses 201*s* serving as the positioned portion are retracted to the −Y direction, i.e., second side in the first direction, from the detectable position such that the positioning bosses 201*s* are disengaged from the positioning holes 61 (FIG. 4) serving as the positioning portion. Further, the detectable position is a position of the detection unit 199 in the detectable state described below, and the retracting position is a position of the detection unit 199 in the retracted state.

The first bosses 201*a* are fit both movably in the Y and Z directions and rotatably with respect to first boss holes 202*a* of the swing lever 202. One of the first bosses 201*a* is protruded in the +X direction from an end face in the +X direction of the substrate holder 201. The other of the first bosses 201*a* is protruded in the −X direction from an end face in the −X direction of the substrate holder 201.

The second bosses 201*b* are fit both movably in the X and Y directions and rotatably with respect to second boss holes 203*b* of the base holder 203. One of the second bosses 201*b* is protruded in the +Z direction from an end face in the +Z direction of the substrate holder 201. The other of the second bosses 201*b* is protruded in the −Z direction from an end face in the −Z direction of the substrate holder 201.

One of the optical path holes 201*d* faces the light emitting portion 200*a*. The other of the optical path holes 201*d* faces the light receiving portion 200*b*. That is, when viewed in the +Y direction side, the light emitting portion 200*a* and the light receiving portion 200*b* are positioned on the inner side of the optical path holes 201*d*. When the toner cartridge T is attached to the apparatus body 100A, the light emitting portion 200*a* faces the incident portion 112*a* (FIG. 4) of the light guide member 110 through the optical path hole 201*d*. Further, in the above-described case, the light receiving portion 200*b* faces the emitting portion 113*a* (FIG. 4) of the light guide member 110 through the optical path hole 201*d*.

The compression springs 204 are an example of an urging member that urges the detection unit 199. The compression springs 204 according to the present embodiment urges the detection unit 199 in the +Y direction. The compression springs 204 are disposed between the substrate holder 201 and the base holder 203 with their axial directions oriented in the Y direction. Further, spring members other than the compression spring or elastomers may also be used as the urging member.

The compression springs 204 according to the present embodiment are arranged on both sides in the +Z and −Z directions with respect to the first bosses 201*a*. Further, the compression springs 204 according to the present embodiment are arranged at an X-direction position that is overlapped with a center of the second bosses 201*b* in the X direction. Thereby, the inclination of the sensor substrate 200 in a state where the detection unit 199 is positioned in the Y direction by the urging force of the compression springs 204 may be reduced.

Specifically, according to the present embodiment, in a usable state illustrated in FIGS. 8A and 9A described below, the substrate holder 201 is abutted against a left side plate 250 by the urging force of the compression springs 204. Therefore, the position of the detection unit 199 around the first bosses 201*a* and around the second bosses 201*b* is determined based on the left side plate 250. If the compression spring 204 is disposed only on the +Z direction side of the first bosses 201*a*, form errors of the substrate holder 201 near the compression springs 204 may easily be actualized as the inclination of the sensor substrate 200. The form errors of the substrate holder 201 may be a curvature of a contact surface of the substrate holder 201 with respect to the left side plate 250 caused by the distortion during resin molding, for example. A similar concern exists in a case where the compression springs 204 are arranged in an offset manner from the second bosses 201*b* in the X direction. According to the arrangement of the compression springs 204 of the present embodiment, the substrate holder 201 receives urging force at both sides of the first bosses 201*a* in the Z direction, such that the effect of form errors of the substrate holder 201 may be reduced, and the inclination of the sensor substrate 200 in the usable state may be reduced. In order to enhance the dimensional accuracy of the contact portion with respect to the left side plate 250 of the substrate holder 201, the contact portion may be formed in a rib shape 201*r* (FIG. 5).

Instead of the configuration of arranging the compression springs 204 on both sides in the Z direction of the first bosses 201*a*, it is possible to arrange the compression springs 204 in the Z direction to be overlapped with the center of the first bosses 201*a* in the Z direction. For example, only one compression spring 204 may be arranged at a center position of the first bosses 201*a* in the Z direction and at a position overlapped with the center position of the second bosses 201*b* in the X direction.

The base holder 203 includes the second boss holes 203*b* and supporting holes 203*c*. The second bosses 201*b* of the substrate holder 201 are fit to the second boss holes 203*b*. Support shafts 202*c* of the swing lever 202 are fit to the supporting holes 203*c*.

The base holder 203 is an example of a support member configured to support the swing lever 202. The base holder 203 is fixed to the frame body of the apparatus body 100A. The base holder 203 according to the present embodiment is fixed by screw engagement, bonding, and other methods to the left side plate 250 (FIGS. 8B and 9B) of the apparatus body 100A.

The frame body of the apparatus body 100A includes the left side plate 250 arranged on one side in the longitudinal direction and a right side plate arranged on the other side with respect to an attachment space in which the process cartridge P and the toner cartridge T are attached. The left side plate 250 is positioned on the left side of the process cartridge P and the toner cartridge T when viewed from a front side of the image forming apparatus 100, i.e., a downstream side in a sheet discharge direction of the discharge roller pair 107 in FIG. 1.

The swing lever 202 is an example of a swing member that supports the detection unit 199 and swings such that the detection unit 199 moves to the detectable position and the retracting position. The swing lever 202 includes the first boss holes 202*a*, the support shafts 202*c*, and a hook portion 202*t*. The second bosses 201*b* of the substrate holder 201 are fit to the first boss holes 202*a*. The hook portion 202*t* is a force receiving portion that receives force from an interlocking mechanism being interlocked with the opening of the door 275 as described below.

The support shafts 202*c* are fit to and rotatably supported by the supporting holes 203*c* of the base holder 203. The swing lever 202 is swingable about the support shafts 202*c* with respect to the base holder 203. The swing lever 202 according to the present embodiment extends in the +Z direction side from the support shafts 202*c*, and swings about an axis that extends in the X direction such that the first boss holes 202*a* move in the Y direction.

Detectable State and Retracted State

Figure 6B:
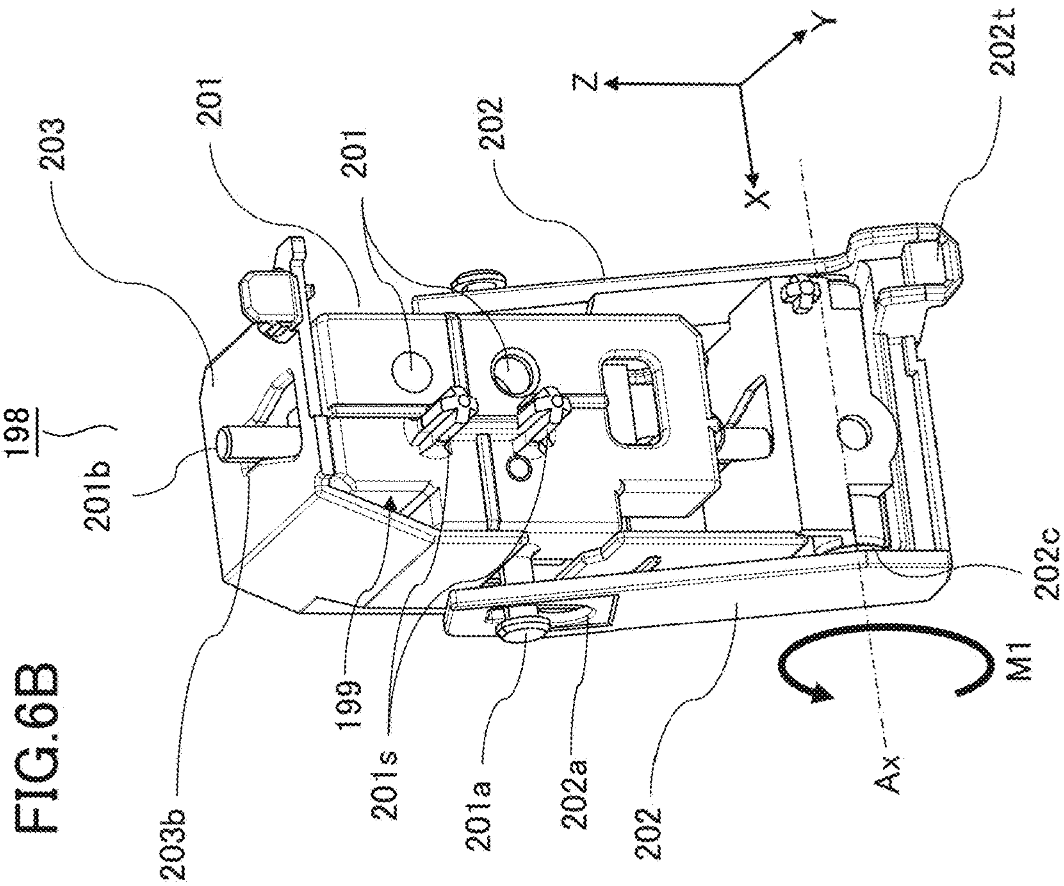
FIGS. 6A and 6B are each a perspective view of the detection unit assembly according to the first embodiment.
Figure 6A:
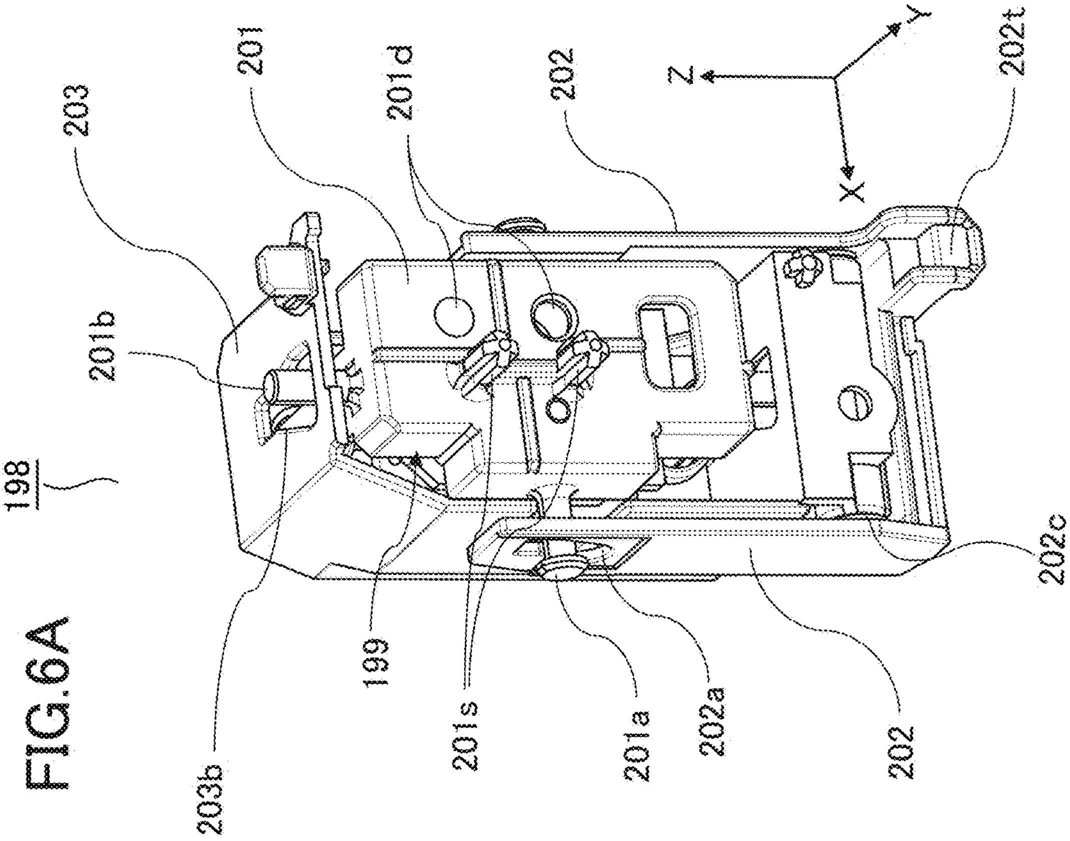

The detectable state and the retracted state of the detection unit assembly 198 are described with reference to FIGS. 6A and 6B. FIG. 6A is a perspective view illustrating the detection unit assembly 198 in the detectable state. FIG. 6B is a perspective view illustrating the detection unit assembly 198 in the retracted state.

The detectable state of the detection unit assembly 198 is a state in which the detection unit 199 is positioned at the detectable position. The retracted state of the detection unit assembly 198 is a state in which the detection unit 199 is positioned at the retracting position. Further, the detectable state of the detection unit assembly 198 is a state of the detection unit assembly 198 in which the toner cartridge T is not attached to the apparatus body 100A, which is hereinafter referred to as a cartridge non-attached state. The retracted state of the detection unit assembly 198 is a state of the detection unit assembly 198 in which the toner cartridge T is attached to the apparatus body 100A, which is hereinafter referred to as a cartridge attached state.

As described above, the swing lever 202 is swingable with respect to the base holder 203, and along with the swinging of the swing lever 202, the first bosses 201*a* move in the Y direction. Therefore, the detection unit 199 is movable in the Y direction with respect to the base holder 203.

Further, at least in the detectable state illustrated in FIG. 6A, the detection unit 199 is in a movable state, i.e., float state, capable of moving in the X and Z directions with respect to the base holder 203. In the present embodiment, the swing lever 202 serving as a swing member is configured to allow movement of the detection unit 199 in a second direction, i.e., Z direction, orthogonal to the first direction, i.e., Y direction. Further, the base holder 203 serving as a support member is configured to allow movement of the detection unit 199 in a third direction, i.e., X direction, orthogonal to the first direction, i.e., Y direction.

Specifically, a Z-direction width of the first boss holes 202*a*, i.e., hole portions, of the swing lever 202 is set wider than a Z-direction width of the first bosses 201*a*, i.e., protruding portion, of the substrate holder 201. In other words, a clearance that allows movement of the detection unit 199 in the Z direction, i.e., Z-direction clearance, is set between the first boss holes 202*a* and the first bosses 201*a*. In other words, the detection unit 199 includes a protruding portion that protrudes in the third direction, i.e., X direction, orthogonal to both the first direction, i.e., Y direction, and the second direction, i.e., Z direction. Further, the swing lever 202 serving as a swing member includes a hole portion (second hole portion) to which the protruding portion is inserted, and the width of the hole portion in the second direction is wider than the width of the protruding portion in the second direction.

Further, the X-direction width of the second boss holes 203*b* of the base holder 203 is set wider than the X-direction width of the second bosses 201*b* of the substrate holder 201. In other words, a clearance that allows movement of the detection unit 199 in the X direction, i.e., X-direction clearance, is set between the second boss holes 203*b* and the second bosses 201*b*.

In the detectable state illustrated in FIG. 6A, the hook portion 202*t* of the swing lever 202 does not receive pressing force from the interlocking mechanism. Therefore, the detection unit 199 is positioned at a position on the +Y direction side by the urging force of the compression springs 204 (FIG. 5).

In the retracted state illustrated in FIG. 6B, the hook portion 202*t* of the swing lever 202 receives pressing force from the interlocking mechanism. By this pressing force, a moment M1 about a swing axis Ax acts on the swing lever 202, and the swing lever 202 swings in a direction such that the first boss holes 202*a* move to the −Y direction side. Thereby, the detection unit 199 is positioned at a position moved to the −Y direction side against the urging force of the compression springs 204 (FIG. 5) with the detectable state serving as reference. When the pressure on the hook portion 202*t* is released, the detection unit 199 returns to the detectable state of FIG. 6A.

As described later, in the cartridge attached state, the positioning bosses 201*s* of the detection unit 199 positioned at the detectable position fit to the positioning holes 61 (FIG. 4) of the toner cartridge T. Thereby, the detection unit 199 is positioned on the toner cartridge T in the X and Z directions.

Meanwhile, in the cartridge non-attached state, the positioning bosses 201*s* are released from the positioning holes 61. Therefore, in the cartridge non-attached state, the position of the detection unit 199 may be varied in the X and Z directions. In this case, depending on the position of the detection unit 199 in the cartridge non-attached state, the positioning bosses 201*s* may not fit correctly to the positioning holes 61 when the toner cartridge T is attached.

Clearance Control

Therefore, according to the present embodiment, a clearance, i.e., play, or range in which movement is allowed, of the detection unit 199 in the retracted state is set to be smaller compared to the clearance in the detectable state. Hereafter, a configuration related to clearance control will be described with reference to FIGS. 7A, 7B, 8A, and 8B.

Figure 7A:
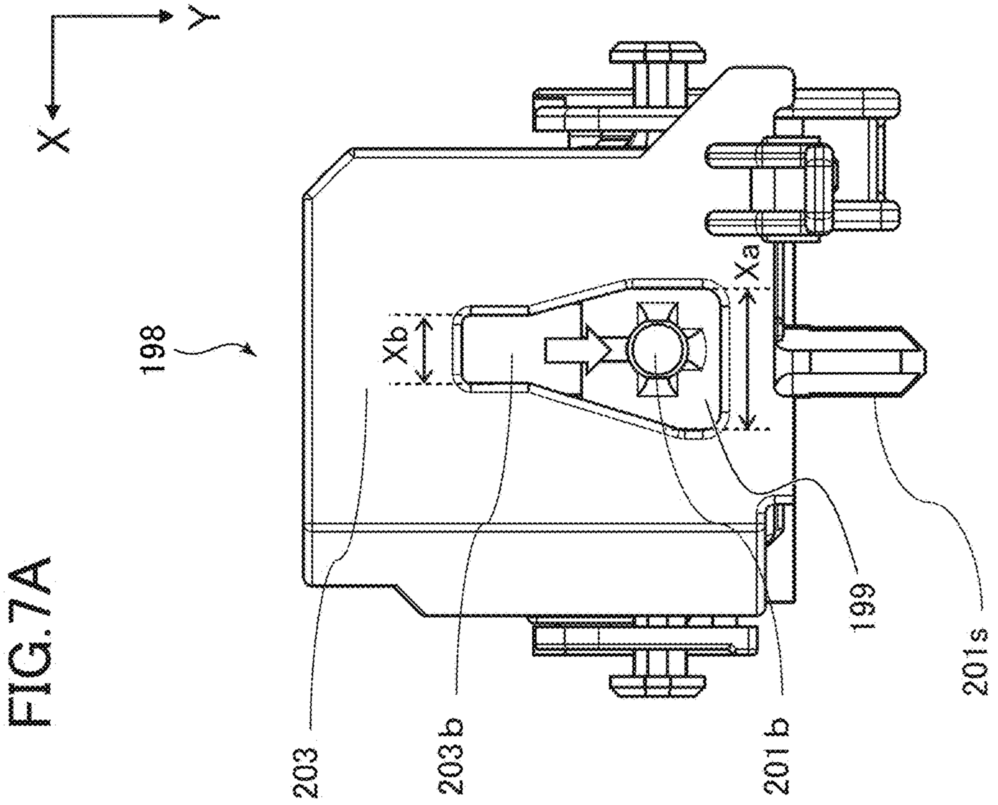
FIGS. 7A and 7B are each a view illustrating the detection unit assembly according to the first embodiment from a +Z direction.
Figure 7B:
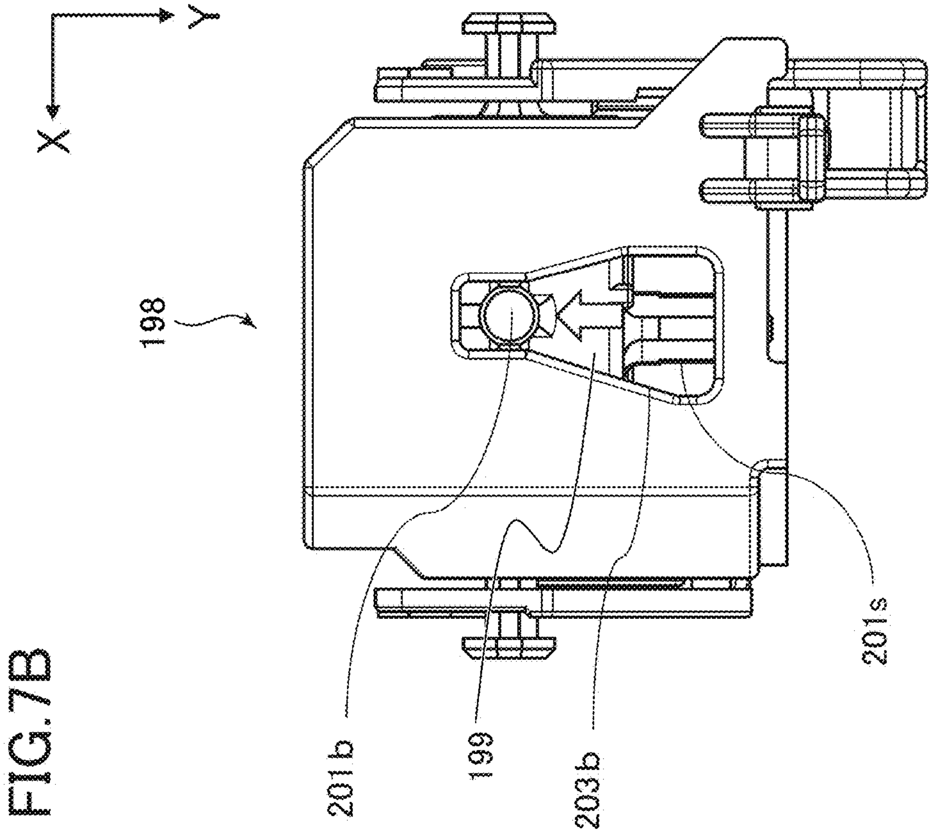

At first, an X-direction clearance will be described with reference to FIGS. 7A and 7B. FIG. 7A is a top view illustrating the detection unit assembly 198 in the detectable state. FIG. 7B is a top view illustrating the detection unit assembly 198 in the retracted state.

As illustrated in FIG. 7A, the second boss holes 203*b* are formed in an approximately trapezoidal shape such that the X-direction clearance between the second boss holes 203*b* and the second bosses 201*b* varies according to the Y-direction position. That is, an X-direction width Xa of the second boss holes 203*b* in the first position on the +Y direction side is wider than an X-direction width Xb of the second boss holes 203*b* in the second position on the −Y direction side with respect to the first position (Xa>Xb).

In other words, the detection unit 199 includes a protruding portion that protrudes in a second direction, i.e., Z direction, orthogonal to both the first direction, i.e., Y direction, and the third direction, i.e., X direction. The support member includes a hole portion (third hole portion), i.e., the second boss hole 203*b*, through which the protruding portion is inserted. In a state where the detection unit is positioned at the second position, a width (Xb) of the hole portion in the third direction at the position of the protruding portion in the first direction is narrower than a width (Xa) of the hole portion in the third direction at the position of the protruding portion in the first direction when the detection unit is positioned at the first position.

Therefore, the X-direction clearance in the retracted state illustrated in FIG. 7B is smaller than the X-direction clearance in the detectable state illustrated in FIG. 7A.

In the detectable state illustrated in FIG. 7A, the position of the detection unit 199 in the X direction is determined based on the toner cartridge T by the fitting of the positioning bosses 201*s* and the positioning holes 61. Therefore, by increasing the X-direction clearance in the detectable state, the possibility of the positioning of the detection unit 199 being obstructed by interference of the base holder 203 may be reduced.

Meanwhile, in the retracted state illustrated in FIG. 7B, it is advantageous for the X-direction clearance to be smaller due to the reasons described below. In the present embodiment, according to the interlocking mechanism described below, the detection unit 199 moves from the retracting position to the detectable position in an interlocked manner with the operation of closing the door 275. When the detection unit 199 is at the retracting position, in other words, when the door 275 is opened, the opening portion 274 of the apparatus body 100A is opened. Therefore, the hand of a user may come into contact with the detection unit 199, possibly causing the position of the detection unit 199 to be deviated within the range of the X-direction clearance. Further, when the image forming apparatus 100 is tilted by the user, the position of the detection unit 199 may also be deviated within the range of the X-direction clearance. If the door 275 is closed in a state where the detection unit 199 is greatly misaligned, the positioning bosses 201*s* may not fit smoothly to the positioning holes 61, and operation failure of the detection unit 199 may occur.

In the present embodiment, the X-direction clearance in the retracted state is smaller than that in the detectable state. In other words, the range in which the support member allows movement of the detection unit in the third direction in a state where the detection unit is positioned at the second position is narrower than the range in which the support member allows movement of the detection unit in the third direction in a state where the detection unit is positioned at the first position. Therefore, it is possible to prevent the X-direction position of the detection unit 199 from deviating greatly in the retracted state. Then, it becomes possible to reduce the possibility of occurrence of operation failure when the detection unit assembly 198 is transited from the retracted state to the detectable state, and a more stable operation may be realized.

Figure 8B:
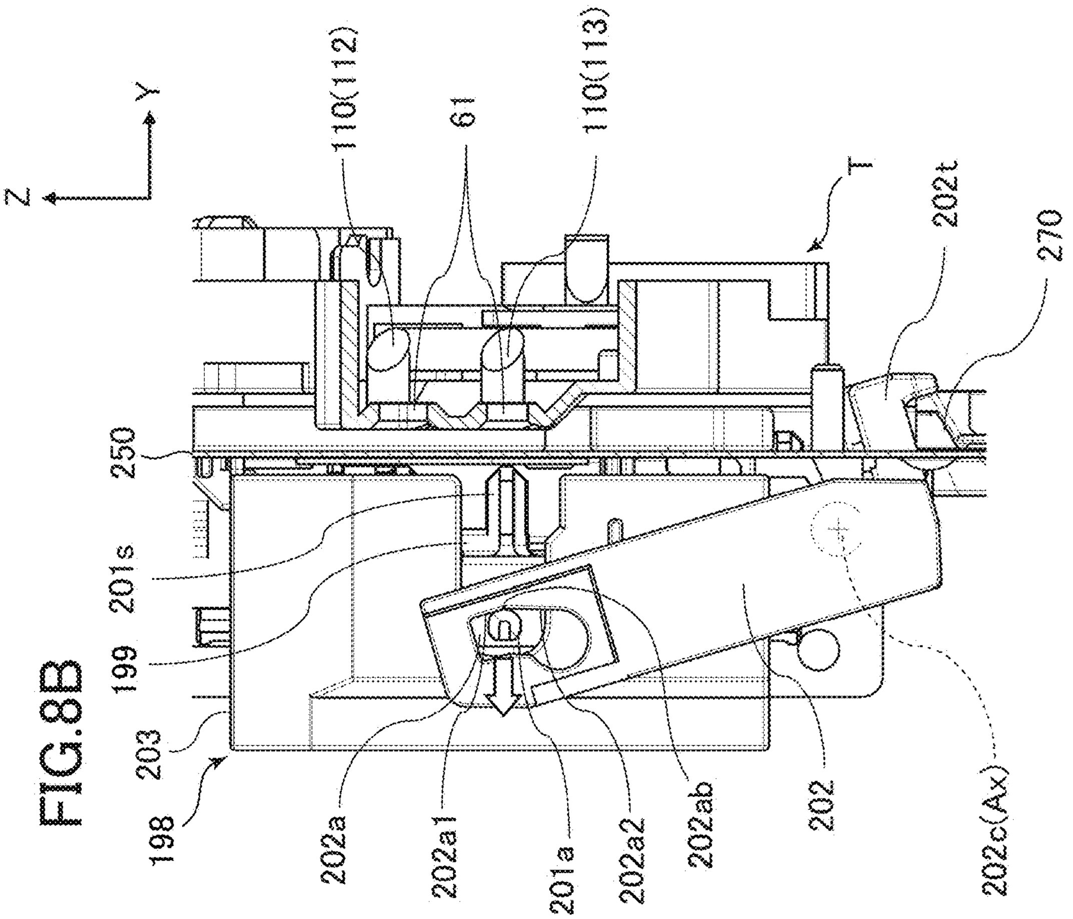
FIGS. 8A and 8B are each a view illustrating the detection unit assembly according to the first embodiment from a +X direction.

Next, the Z-direction clearance will be described with reference to FIGS. 8A and 8B. FIG. 8A is a view in which a side view of the detection unit assembly 198 in the detectable state taken from the +X direction is combined with a cross-sectional view of a part of the apparatus body 100A and a part of the toner cartridge T in the cartridge attached state. FIG. 8B is a view in which a side view of the detection unit assembly 198 in the retracted state taken from the +X direction is combined with a cross-sectional view of a part of the apparatus body 100A and a part of the toner cartridge T before the toner cartridge is attached to the apparatus body 100A.

Figure 8A:
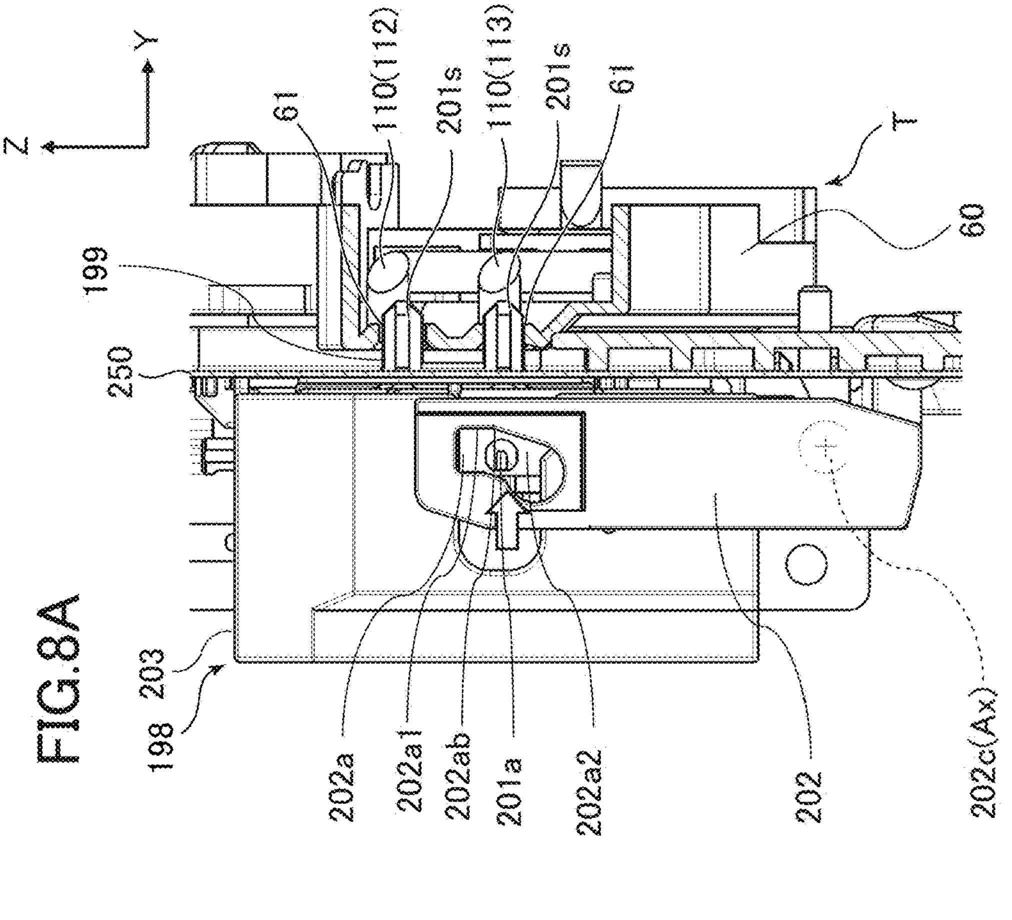

As illustrated in FIG. 8A, the Z-direction width of the first boss holes 202*a* of the swing lever 202 is greater than the Z-direction width of the first bosses 201*a* of the substrate holder 201. Further, a rim on the +Y direction side of each of the first boss holes 202*a* includes a first surface 202*a*1 and a second surface 202*a*2 of different angles. A concave portion 202*ab* having a concave portion that is concaved to the +Y-direction side is formed between the first surface 202*a*1 and the second surface 202*a*2 based on the angle of the swing lever 202 in a state where the detection unit 199 is positioned at the retracting position (FIG. 8B).

In the detectable state illustrated in FIG. 8A, the position of the detection unit 199 in the Z direction is determined based on the toner cartridge T by the fitting of the positioning bosses 201*s* and the positioning holes 61. In the detectable state, the first bosses 201*a* are not in contact with the first surface 202*a*1 and the second surface 202*a*2 of the first boss holes 202*a*, and the detection unit 199 is movable in the Z direction within the range of the Z-direction clearance. By widening the Z-direction clearance in the detectable state, it becomes possible to reduce the possibility of the positioning of the detection unit 199 being obstructed by interference of the base holder 203.

Meanwhile, in the retracted state illustrated in FIG. 8B, the Z-direction clearance should advantageously be as small as possible, due to the same reasons as the X-direction clearance. According to the present embodiment, in the retracted state, by the swing lever 202 swinging in the counterclockwise direction in the drawing based on the detectable state, the first bosses 201*a* come into contact with the first surface 202*a*1 and the second surface 202*a*2 of the first boss holes 202*a*. The first bosses 201*a* are pressed against the first surface 202*a*1 and the second surface 202*a*2 of the first boss holes 202*a* by the urging force of the compression springs 204. A reaction force that the first bosses 201*a* receive from the first surface 202*a*1 contains a downward component in the Z direction, and the reaction force that the first bosses 201*a* receive from the second surface 202*a*2 contains an upward component in the Z direction. Therefore, in the retracted state, the position of the detection unit 199 in the Z direction is determined by the first bosses 201*a* being retained in the concave portion 202*ab*.

That is, the rim of the hole portion of the swing member includes a concave shape, i.e., the concave portion 202*ab*, that comes into contact with the protruding portion when the detection unit is positioned at the second position and that positions the protruding portion in the second direction. Further, in a state where the detection unit is positioned at the first position, the protruding portion does not come into contact with the concave shape.

As described, according to the present embodiment, the Z-direction clearance in the retracted state is smaller than that in the detectable state. In other words, the range in which the swing member allows movement of the detection unit in the second direction in a state where the detection unit is positioned at the second position is narrower than the range in which the swing member allows movement of the detection unit in the second direction in a state where the detection unit is positioned at the first position. Therefore, it is possible to prevent the Z-direction position of the detection unit 199 from being deviated greatly in the retracted state. Then, it becomes possible to reduce the possibility of occurrence of operation failures when the detection unit assembly 198 is transited from the retracted state to the detectable state, and a more stable operation may be realized.

In the present embodiment, an example has been illustrated of a case where the swing lever 202 supports the detection unit 199 movably in the Z direction and the base holder supports the detection unit 199 movably in the X direction. As a modified example, it may be possible to have the swing lever 202 support the detection unit 199 movably in the X direction and have the base holder support the detection unit 199 movably in the Z direction. For example, it may be possible to arrange boss holes having the same hole shape in Z-direction view as the first boss holes 202*a* according to the present embodiment in X-direction view on the swing lever 202, and have the second bosses 201*b* fit to the boss holes. Moreover, it may be possible to arrange boss holes having the same hole shape in X-direction view as the second boss holes 203*b* according to the present embodiment in Z-direction view on the base holder 203, and have the first bosses 201*a* fit to the boss holes. In other words, in the configuration where the swing member allows movement of the detection unit in the second direction orthogonal to the first direction, the second direction may be the X direction. Further, in the configuration where the support member allows movement of the detection unit in the third direction orthogonal to the first direction, the third direction may be the Z direction.

Interlocking Mechanism

Figure 9B:
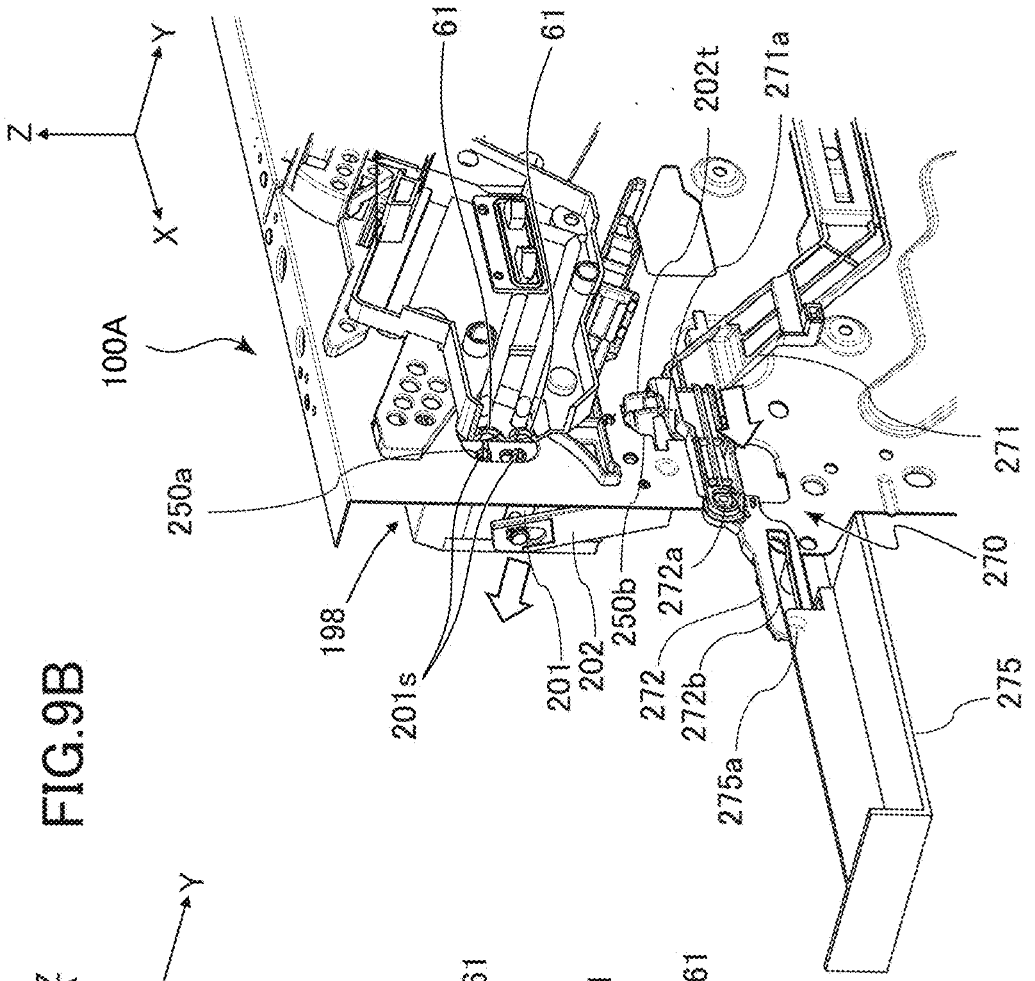
FIGS. 9A and 9B are each an explanatory view illustrating an operation of an apparatus according to the first embodiment.

An interlocking mechanism 270 that moves the detection unit 199 to the detectable position and the retracting position in an interlocked manner with the movement, specifically the opening and closing operation, of the door 275 will be described with reference to FIGS. 9A and 9B. FIG. 9A is a view illustrating a portion of the apparatus body 100A and a portion of the toner cartridge T in a state where the door 275 is at the closed position. FIG. 9B is a view illustrating a portion of the apparatus body 100A and a portion of the toner cartridge T in a state where the door 275 is at the opened position. In FIGS. 9A and 9B, only the light guide member 110 and the side cover 60 of the toner cartridge T is illustrated, and other components of the toner cartridge T are not shown. Further, in order to clarify the positional relationship with the positioning bosses 201*s*, the side cover 60 is illustrated in a state cut at a plane passing the center of the positioning holes 61.

Figure 9A:
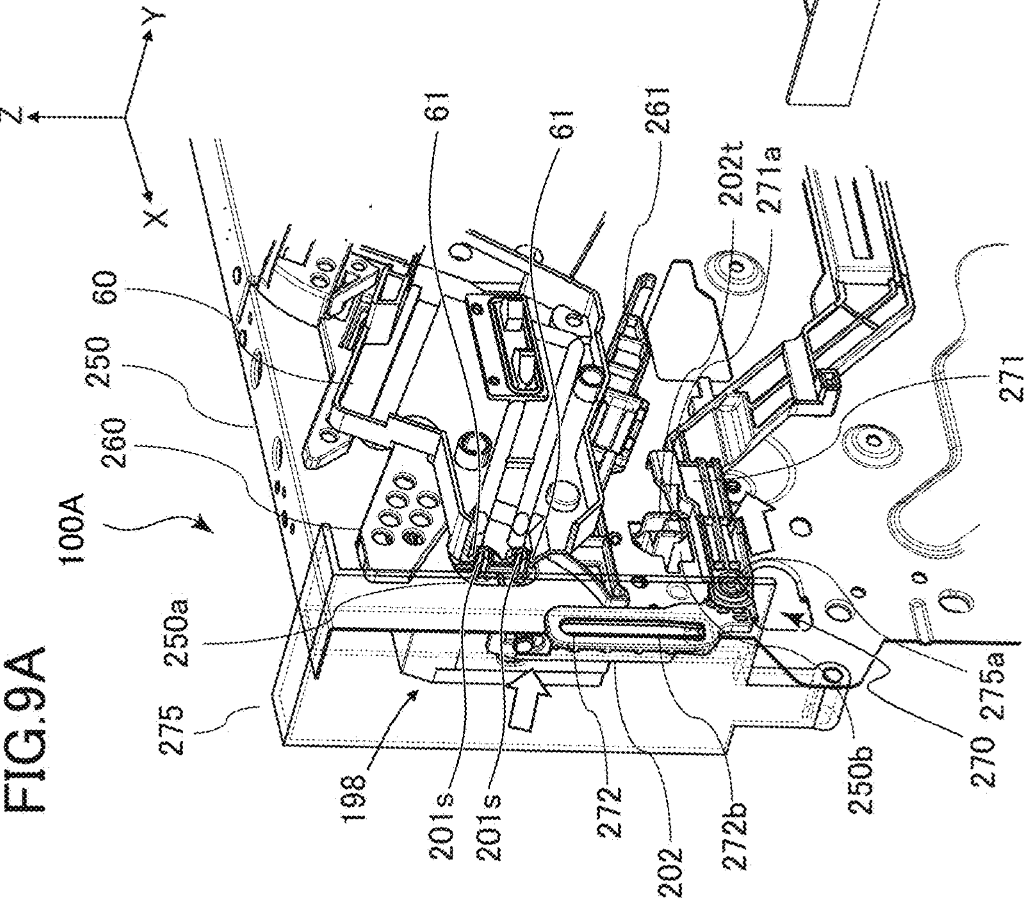

As illustrated in FIG. 9A, the apparatus body 100A includes the interlocking mechanism 270. The interlocking mechanism 270 includes a first link 271 and a second link 272. The first link 271 is a link member being interlocked to the door 275. The first link 271 according to the present embodiment is connected to the door 275 via the second link 272. As described below, in an interlocked manner with the opening and closing operation of the door 275, the first link 271 slides, and the first link 271 causes the hook portion 202*t* of the swing lever 202 to be pressed or to be released from the pressing state, by which the detection unit assembly 198 may be transited to the detectable state and to the retracted state. Further, the first link 271 may be configured to be interlocked with the door 275 by being directly connected to the door 275.

The first link 271 is arranged on the inner side of the left side plate 250, i.e., the side of the attachment space in which the toner cartridge T is attached. The first link 271 is supported slidably in the X direction by the frame body, that is, the left side plate 250 and a core frame not shown, of the apparatus body 100A. The first link 271 includes a pressing portion 271*a* capable of pressing the hook portion 202*t* of the swing lever 202. The pressing portion 271*a* is an inclined surface capable of pushing up the hook portion 202*t* in the +Z direction when the first link 271 slides in the +X direction. Further, the end portion in the +X-direction side of the first link 271 is connected pivotably to the second link 272.

The second link 272 is rotatable around a Y-direction axis about a connecting portion 272*a* connected to the first link 271. Further, the second link 272 includes a long hole 272*b* to which a boss 275*a* of the door 275 is fit.

The detection unit assembly 198 is attached to an outer side surface, that is, the surface on the −Y-direction side, of the left side plate 250. Opening portions 250*a* and 250*b* that are passed through in the Y direction are formed on the left side plate 250. The opening portion 250*a* allows the positioning bosses 201*s* of the substrate holder 201 to protrude to the inner side, i.e., +Y-direction side, of the left side plate 250. Further, the opening portion 250*b* allows the hook portion 202*t* of the swing lever 202 to protrude to the inner side, i.e., +Y-direction side, of the left side plate 250.

In other words, the apparatus body includes a side plate, i.e., the left side plate 250, that is arranged on the second side, i.e., −Y-direction side, in the first direction with respect to the attachable/detachable unit in a state attached to the apparatus body and that is extended to intersect the first direction. Further, the detection unit is attached to the surface on the second side, i.e., −Y-direction side, in the first direction of the side plate. When the detection unit is at the first position (FIG. 9A), the protruded portion, i.e., the positioning bosses 201*s*, passes through the hole portion (fourth hole portion), i.e., the opening portion 250*a*, disposed on the side plate, and protrudes to the first side, i.e., +Y-direction side, in the first direction with respect to the side plate.

Further, cartridge guides 260 and 261 are attached to an inner side surface of the left side plate 250. When the toner cartridge T is attached to the apparatus body 100A, the direction of movement of the toner cartridge T is regulated to the attachment direction by a portion-to-be-guided of the toner cartridge T being guided by the cartridge guides 260 and 261.

As illustrated in FIG. 9A, when the door 275 is at the closed position, the first link 271 is at a position on the −X-direction side. In this case, the pressing portion 271*a* of the first link 271 is not in contact with the hook portion 202*t* of the swing lever 202. Since the hook portion 202*t* is not pressed, the detection unit assembly 198 is in a detectable state (FIGS. 6A, 7A, and 8A).

In the detectable state, the positioning bosses 201*s* protrude in the +Y direction with respect to the left side plate 250. Then, when the door 275 is at the closed position with the toner cartridge T attached to the apparatus body 100A, the positioning bosses 201*s* fit to the positioning holes 61 of the side cover 60 of the toner cartridge T. Thereby, the position of the detection unit 199 in the X and Z directions is determined based on the positioning holes 61 of the toner cartridge T. That is, the positioning accuracy of the light emitting portion 200*a* and the light receiving portion 200*b* with respect to the light guide member 110 may be improved.

If misalignment of the light emitting portion 200*a* and the light receiving portion 200*b* to the light guide member 110 is great, the amount of light reaching the light receiving portion 200*b* is reduced due to the deviation of the optical axis or the variation of optical path length, and the detection accuracy of the amount of waste toner within the waste toner storage unit 40 may be deteriorated. According to the present embodiment, by improving the positioning accuracy of the light emitting portion 200*a* and the light receiving portion 200*b* to the light guide member 110, a more stable detection accuracy of the amount of waste toner may be realized.

Further, the position of the detection unit 199 in the Y direction may be determined by the substrate holder 201 being abutted against the outer side surface of the left side plate 250 by the urging force of the compression springs 204. Therefore, in the detectable state, the position of the detection unit 199 in the Y direction is determined based on the left side plate 250.

When the door 275 is pivoted toward the opened position from the state of FIG. 9A, the boss 275*a* of the door 275 slides within the long hole 272*b* of the second link 272 while the second link 272 is pivoted in the counterclockwise direction in the drawing. Further, the first link 271 receives force from the connecting portion 272*a* of the second link 272 and slides in the +X direction.

As illustrated in FIG. 9B, before the door 275 reaches the opened position, the pressing portion 271*a* of the first link 271 comes into contact with the hook portion 202*t* and presses the hook portion 202*t* in the +Z direction. Thereby, the swing lever 202 swings, and along with the swinging of the swing lever 202, the substrate holder 201 moves to the −Y direction. By the substrate holder 201 moving in the −Y direction, the positioning bosses 201*s* are disengaged from the positioning holes 61 to the −Y direction.

As described, the interlocking mechanism 270 moves the substrate holder 201 to an opposite direction, i.e., −Y direction, from the direction of projection, i.e., +Y direction, of the positioning bosses 201*s* in an interlocked manner with the operation of opening the door 275, and causes the positioning bosses 201*s* to retract from the positioning holes 61. Thereby, when the door 275 is at the opened position, the user may insert or remove the toner cartridge T without having the positioning bosses 201*s* of the apparatus body 100A interfere with the positioning holes 61 of the toner cartridge T.

When the door 275 pivots to the −X-direction side toward the closed position from the state of FIG. 9B, the boss 275*a* of the door 275 slides within the long hole 272*b* of the second link 272 while the second link 272 is pivoted in the clockwise direction in the drawing. Further, the first link 271 receives force from the connecting portion 272*a* of the second link 272 and slides in the −X direction.

As illustrated in FIG. 9A, before the door 275 reaches the opened position, the pressing portion 271*a* of the first link 271 is disengaged from the hook portion 202*t*, and the swing lever 202 is released from the pressing force of the first link 271. Then, the detection unit 199 moves to the +Y direction by the urging force of the compression springs 204, and the positioning bosses 201*s* protrude in the +Y direction with respect to the left side plate 250 and fits to the positioning holes 61 of the toner cartridge T. Thereby, the position of the detection unit 199 in the X and Z directions is determined based on the positioning holes 61 of the toner cartridge T.

As described, the interlocking mechanism 270 moves the substrate holder 201 to a projecting direction, i.e., +Y direction, of the positioning bosses 201*s* in an interlocked manner with the operation of closing the door 275, and causes the positioning bosses 201*s* to be fit to the positioning holes 61. Thereby, when the user closes the door 275 after attaching the toner cartridge T to the apparatus body 100A, a state may be realized where the detection unit 199 is positioned on the toner cartridge T.

As described above, the interlocking mechanism 270 may retract the detection unit 199 from the detectable position to the retracting position in an interlocked manner with the operation of opening the door 275, and may move the detection unit 199 from the retracting position to the detectable position in an interlocked manner with the operation of closing the door 275. In other words, the interlocking mechanism moves the detection unit from the first position to the second position when the opening/closing member is moved from the closed position to the opened position. Further, the interlocking mechanism moves the detection unit from the second position to the first position when the opening/closing member is moved from the opened position to the closed position.

As described, according to the present embodiment, an image forming apparatus capable of realizing both the workability of attaching and detaching the attachable/detachable unit and the positioning accuracy of the detection unit 199 serving as the interface unit may be provided.

Modified Example

In the first embodiment, a configuration has been illustrated where the position of the detection unit 199 in the Y direction is determined based on the left side plate 250 in the detectable state. The present technique is not limited to this example, and a configuration may be adopted in which the position of the detection unit 199 in the Y direction is determined based on the toner cartridge T in the detectable state. For example, in the detectable state, the substrate holder 201 may be caused to abut against the side cover 60 by the urging force of the compression springs 204.

Second Embodiment

An image forming apparatus according to a second embodiment will be described with reference to FIGS. 10A, 10B, 11A, and 11B. According to the present embodiment, a portion of a detection unit assembly 298 differs from the detection unit assembly 198 of the first embodiment. Hereafter, unless denoted otherwise, the elements denoted with the same reference numbers as those of the first embodiment have approximately a same configuration and function as those illustrated in the first embodiment, and the parts that differ from the first embodiment will mainly be described.

Detection Unit

Figure 10B:
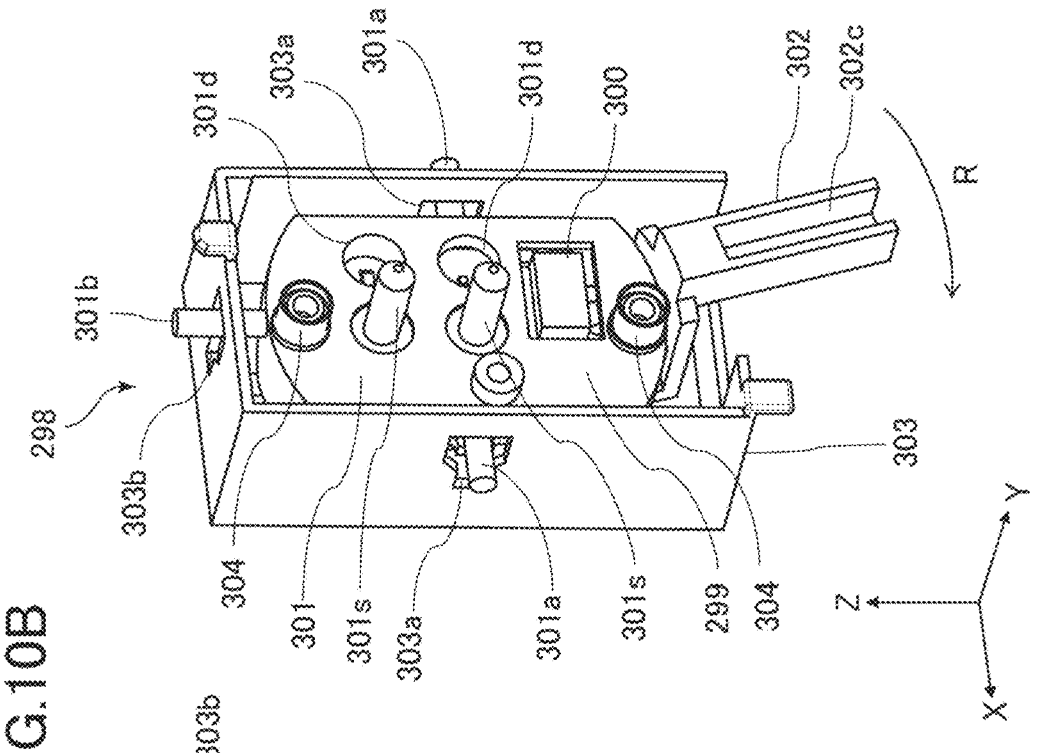
FIG. 10B is a perspective view of the detection unit assembly according to the second embodiment.
Figure 10A:
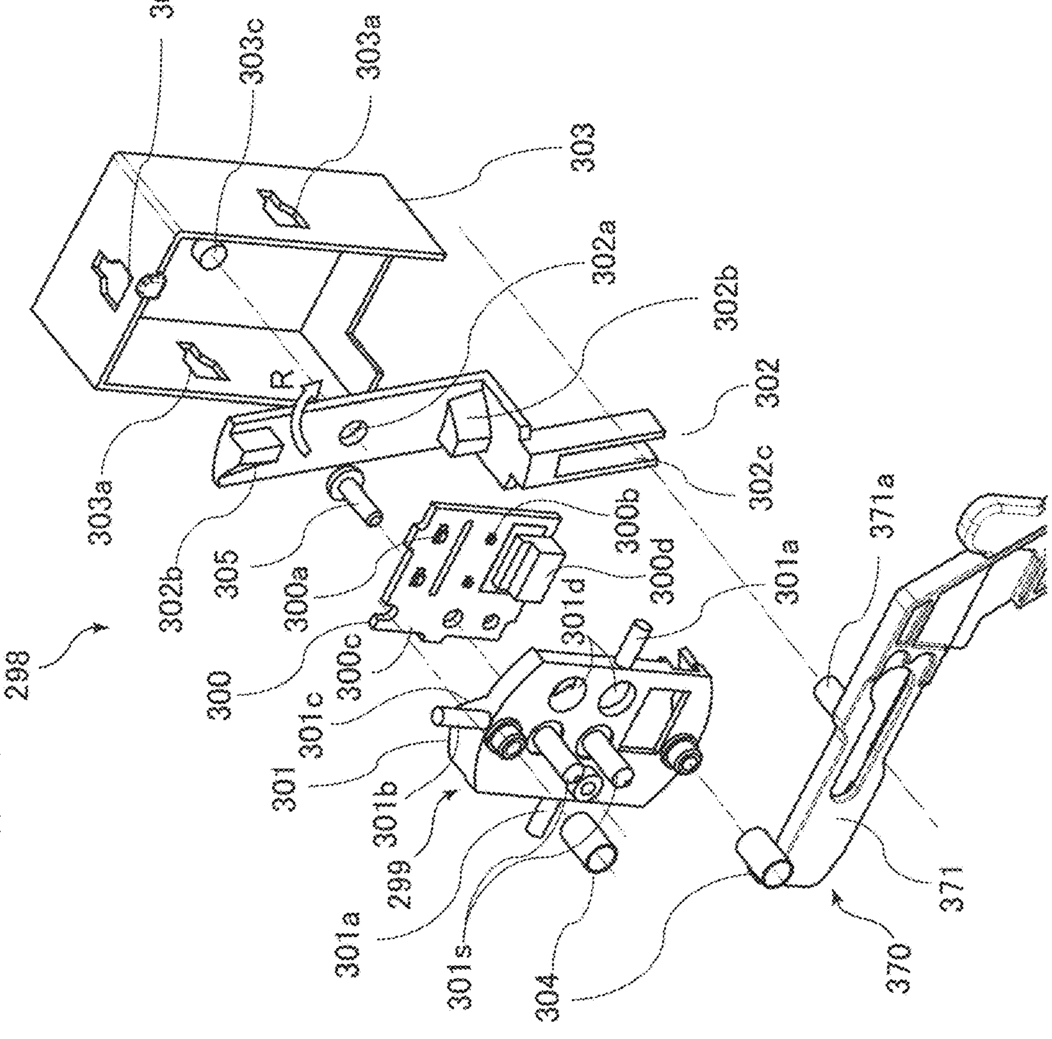
FIG. 10A is an exploded view of a detection unit assembly according to a second embodiment.

The configuration of the detection unit assembly 298 will be described with reference to FIG. 10. FIG. 10A is an exploded view of the detection unit assembly 298. FIG. 10B is a perspective view of the detection unit assembly 298. As illustrated in FIG. 10A, the detection unit assembly 298 includes a detection unit 299 composed of a sensor substrate 300 and a substrate holder 301, a swing lever 302, a base holder 303, and compression springs 304.

The sensor substrate 300 includes a light emitting portion 300*a*, a light receiving portion 300*b*, an insulating substrate 300*c*, and a connector 300*d*. The sensor substrate 300 is fixed to the substrate holder 301 by a screw 305, and moves integrally with the substrate holder 301. The detection unit 299 including the sensor substrate 300 and the substrate holder 301 is movable to a detectable position, i.e., first position, and a retracting position, i.e., second position, retracted in the −Y direction from the detectable position.

The substrate holder 301 includes positioning bosses 301*s* that protrude in the +Y direction, first bosses 301*a* that protrude in the X direction, a second boss 301*b* that protrudes in the Z direction, abutment receiving portions 301*c*, and optical path holes 301*d*. The substrate holder 301 according to the present embodiment includes two positioning bosses 301*s*, two first bosses 301*a*, one second boss 301*b*, two abutment receiving portions 301*c*, and two optical path holes 301*d*.

The positioning bosses 301*s* have positioning shapes for positioning the sensor substrate 300 on the toner cartridge T when the toner cartridge T is attached to the apparatus body 100A. The positioning bosses 301*s* are an example of a positioned portion that is engaged with the positioning portion of the toner cartridge T. Further, the positioning bosses 301*s* are an example of a projecting portion that is engaged with the positioning holes 61, i.e., hole portion, of the toner cartridge T. The positioning bosses 301*s* are protruded in the +Y direction from the end face in the +Y direction of the substrate holder 301. The positioning bosses 301*s* are preferably arranged in the vicinity of the optical path holes 301*d*.

The first bosses 301*a* are fit to first boss holes 303*a* of the base holder 303 both movably in the Y and Z directions and rotatably. One of the first bosses 301*a* is protruded in the +X direction from an end face in the +X direction of the substrate holder 301. The other of the first bosses 301*a* is protruded in the −X direction from an end face in the −X direction of the substrate holder 301.

The second boss 301*b* is fit to a second boss hole 303*b* of the base holder 303 both movably in the X and Y directions and rotatably. The second boss 301*b* is protruded in the +Z direction from an end face in the +Z direction of the substrate holder 301.

The abutment receiving portions 301*c* have an inclined surface formed helically so as to be inclined in the −Y direction toward a swinging direction R of the swing lever 302 described below. The abutment receiving portions 301*c* are abutted against abutment portions 302*b* of the swing lever 302 described below.

One of the optical path holes 301*d* faces the light emitting portion 300*a*. The other of the optical path holes 301*d* faces the light receiving portion 300*b*. When the toner cartridge T is attached to the apparatus body 100A, the light emitting portion 300*a* and the light receiving portion 300*b* face the incident portion 112*a* and the emitting portion 113*a* (FIG. 4) of the light guide member 110 through the optical path holes 301*d*.

The compression springs 304 are an example of an urging member that urges the detection unit 299. The compression springs 304 according to the present embodiment urge the detection unit 299 in the −Y direction. The compression springs 304 are arranged between the substrate holder 301 and the left side plate 250 in the Y direction. The compression springs 304 are fixed by being press-fit to a protrusion of the substrate holder 301, for example. The compression springs 304 are not fixed to the left side plate 250. Further, spring members other than the compression springs or elastomers may be used as the urging member.

The compression springs 304 according to the present embodiment are arranged on both sides in the +Z and −Z directions with respect to the first bosses 301*a*. Further, the compression springs 304 according to the present embodiment are arranged at a X-direction position that is superposed with a center of the second bosses 301*b* in the X direction. Thereby, the inclination of the sensor substrate 300 in a state where the detection unit 299 is positioned in the Y direction by the urging force of the compression springs 304 may be reduced.

The base holder 303 is an example of a support member. The base holder 303 includes the first boss holes 303*a*, the second boss hole 303*b*, and a support shaft 303*c*. The first bosses 301*a* of the substrate holder 301 are fit to the first boss holes 303*a*. The second boss 301*b* of the substrate holder 301 is fit to the second boss hole 303*b*. A hole 302*a* on the swing lever 302 is fit to the support shaft 303*c*. The base holder 303 is fixed to the left side plate 250 of the apparatus body 100A.

The swing lever 302 is an example of a swing member. The swing lever 302 includes the hole 302*a*, the abutment portions 302*b*, and a groove portion 302*c*. The swing lever 302 swings about the support shaft 303*c* extending in the Y direction by having the hole 302*a* fit to the support shaft 303*c* of the base holder 303. The abutment portions 302*b* include an inclined surface that is formed helically so as to be inclined to the −Y-direction side toward the predetermined swinging direction R about the support shaft 303*c*. The abutment portions 302*b* are arranged on opposite sides interposing the hole 302*a*. The groove portion 302*c* is a force receiving portion that receives force from an interlocking mechanism 370 that is interlocked with the opening of the door 275.

The interlocking mechanism 370 according to the present embodiment includes a first link 371 equipped with a boss 371*a* that fits to the groove portion 302*c* of the swing lever 302, and the second link 272 similar to the first embodiment (FIGS. 9A and 9B). The interlocking mechanism 370 switches the detection unit assembly 298 between a detectable state and a retracted state in an interlocked manner with the opening and closing operation of the door 275.

Figure 11B:
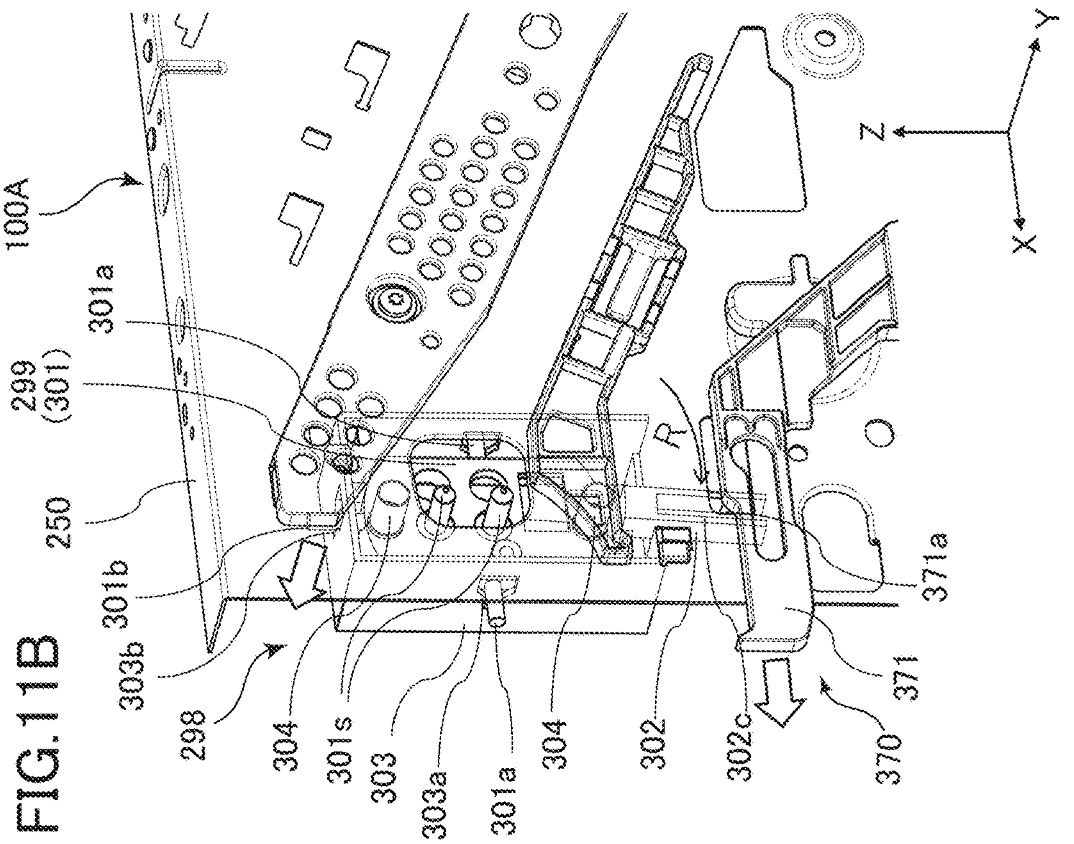
FIGS. 11A and 11B are each an explanatory view illustrating an operation of an apparatus according to the second embodiment.
Figure 11A:
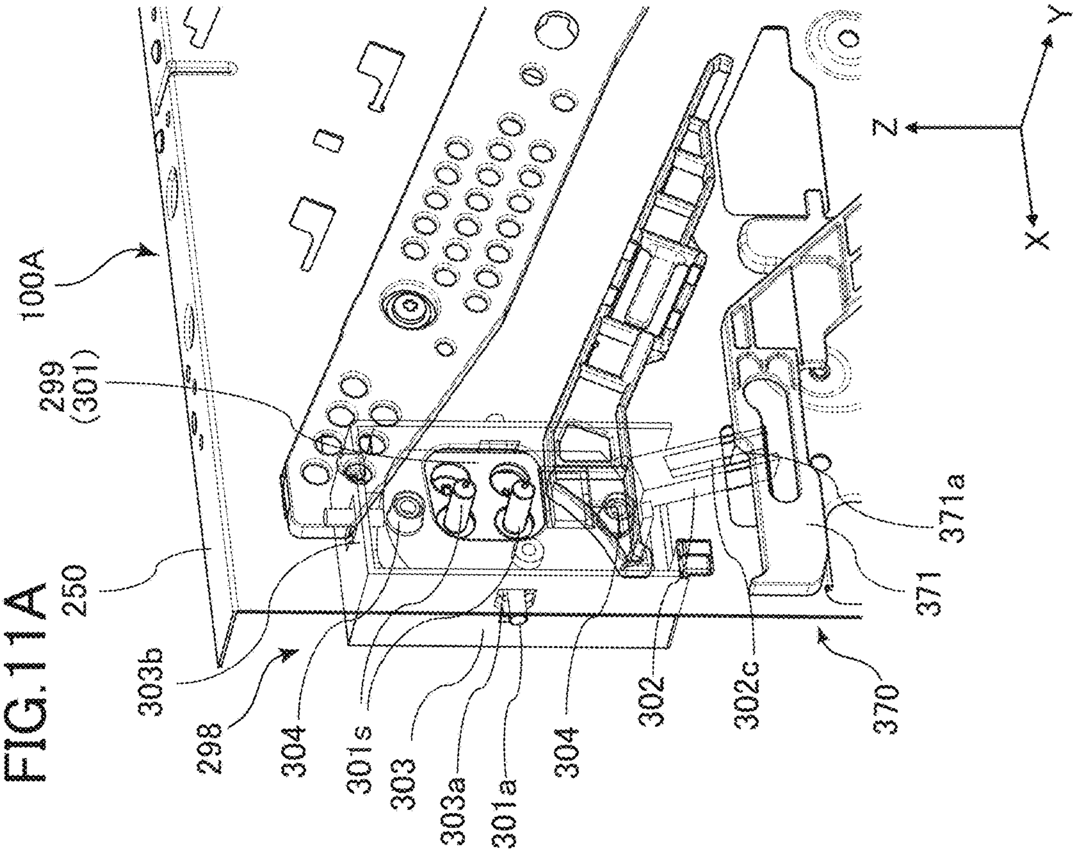

The operation during opening and closing of the door 275 will be described with reference to FIGS. 11A and 11B. FIG. 11A is a view illustrating a portion of the apparatus body 100A in a state where the door 275 is at the closed position. FIG. 11B is a view illustrating a portion of the apparatus body 100A in a state where the door 275 is at the opened position.

As illustrated in FIG. 11A, in a state where the door 275 is at the closed position, the first link 371 is positioned on the −X-direction side. The swing lever 302 is retained at the angle illustrated in FIGS. 10A and 10B by the boss 371*a* of the first link 371. In this case, by having the abutment receiving portions 301*c* of the substrate holder 301 pressed by the abutment portions 302*b* of the swing lever 302, the detection unit 299 is retained in the detectable position against the urging force of the compression springs 304. That is, when the door 275 is at the closed position, the detection unit 299 is in the detectable state.

In the detectable state, the positioning bosses 301*s* are protruded in the +Y direction with respect to the left side plate 250. When the door 275 is at the closed position in a state where the toner cartridge T is attached to the apparatus body 100A, the positioning bosses 301*s* fit to the positioning holes 61 on the side cover 60 of the toner cartridge T. Thereby, the position of the detection unit 299 in X and Z directions is determined based on the positioning holes 61 of the toner cartridge T. That is, the positioning accuracy of the light emitting portion 300*a* and the light receiving portion 300*b* with respect to the light guide member 110 may be improved, and a more stable detection accuracy of the amount of waste toner may be realized.

The position of the detection unit 299 in the Y direction may be determined by having the substrate holder 301 pressed against the swing lever 302 by the urging force of the compression springs 304 in the −Y direction.

When the door 275 is opened from the state of FIG. 11A, the first link 371 slides in the +X direction via the second link 272. As illustrated in FIG. 11B, since the boss 371*a* of the first link 371 is fit to the groove portion 302*c* of the swing lever 302, the swing lever 302 swings in the swinging direction R along with the sliding of the first link 371.

When the swing lever 302 swings in the swinging direction R, the inclined surfaces of the abutment portions 302*b* of the swing lever 302 slide against the inclined surfaces of the abutment receiving portions 301*c* of the substrate holder 301, and the movement of the substrate holder 301 in the −Y direction is allowed. Thereby, the detection unit 299 moves in the −Y direction by the urging force of the compression springs 304. By the movement of the detection unit 299 to the retracting position, the positioning bosses 301*s* are disengaged toward the −Y direction from the positioning holes 61.

As described, the interlocking mechanism 370 moves the detection unit 299 from the detectable position, i.e., first position, to the retracting position, i.e., second position, in an interlocked manner with the movement of opening the door 275. That is, the interlocking mechanism 370 moves the substrate holder 301 to an opposite direction, i.e., −Y direction, as the projecting direction, i.e., +Y direction, of the positioning bosses 301*s* in an interlocked manner with the operation of opening the door 275, and causes the positioning bosses 301*s* to be disengaged from the positioning holes 61. Thereby, when the door 275 is at the opened position, the user may insert or remove the toner cartridge T without having the positioning bosses 301*s* of the apparatus body 100A interfere with the positioning holes 61 of the toner cartridge T.

When the door 275 is closed from the state illustrated in FIG. 11B, the first link 371 slides in the +X direction via the second link 272. As illustrated in FIG. 11A, since the boss 371*a* of the first link 371 fits to the groove portion 302*c* of the swing lever 302, the swing lever 302 swings to the opposite direction of the swinging direction R along with the sliding of the first link 371. Then, when the swing lever 302 swings to the opposite direction of the swinging direction R, the inclined surfaces of the abutment portions 302*b* of the swing lever 302 slide against the inclined surfaces of the abutment receiving portions 301*c* of the substrate holder 301, and the substrate holder 301 moves in the +Y direction against the urging force of the compression springs 304. By having the substrate holder 301 move to the +Y direction, the positioning bosses 301*s* protrude to the +Y direction with respect to the left side plate 250, and fit to the positioning holes 61 of the toner cartridge T. Thereby, the position of the detection unit 299 in the X and Z directions is determined based on the positioning holes 61 of the toner cartridge T.

As described above, the interlocking mechanism 370 moves the detection unit 299 from the retracting position, i.e., second position, to the detectable position, i.e., first position, in an interlocked manner with the operation of closing the door 275. That is, the interlocking mechanism 370 moves the substrate holder 301 to the projecting direction, i.e., +Y direction, of the positioning bosses 301*s* in an interlocked manner with the operation of closing the door 275, and causes the positioning bosses 301*s* to fit to the positioning holes 61. Thereby, when the user closes the door 275 after attaching the toner cartridge T to the apparatus body 100A, a state in which the detection unit 299 is positioned on the toner cartridge T may be realized.

As described, according to the present embodiment, an image forming apparatus capable of realizing both the workability of attachment and detachment of the attachable/detachable unit and the positioning accuracy of the detection unit 299 serving as the interface unit may be provided.

Clearance Control

According to the present embodiment, the clearance of the detection unit 299 in the retracted state is also made smaller than the clearance thereof in the detectable state.

As illustrated in FIG. 10A, the first boss holes 303*a* of the base holder 303 are formed in an approximately trapezoidal shape such that the Z-direction clearance between the first boss holes 303*a* and the first bosses 301*a* varies according to the Y-direction position. That is, a Z-direction width of the first boss holes 303*a* in the first position on the +Y direction side is wider than a Z-direction width of the first boss holes 303*a* in the second position on the −Y direction side with respect to the first position. The first boss holes 303_a_ of the present embodiment are formed in an approximately trapezoidal shape in which a +Y-direction side edge, i.e., bottom edge, is longer than the −Y-direction side edge, i.e., upper edge. Further, the Z-direction clearance in the retracted state illustrated in FIG. 11B is smaller than the Z-direction clearance in the detectable state illustrated in FIG. 11A.

Similarly, the second boss hole 303_b_ of the base holder 303 is formed in an approximately trapezoidal shape such that the X-direction clearance between the second boss hole 303_b_ and the second boss 301_b_ varies according to the Y-direction position. That is, the X-direction width Xa of the second boss hole 303_b_ in the first position on the +Y direction side is wider than the X-direction width Xb of the second boss hole 303_b_ in the second position on the −Y direction side with respect to the first position (Xa>Xb). The second boss hole 303_b_ according to the present embodiment is formed in an approximately trapezoidal shape in which a +Y-direction side edge, i.e., bottom edge, is longer than the −Y-direction side edge, i.e., upper edge. Further, the X-direction clearance in the retracted state illustrated in FIG. 11B is smaller than the X-direction clearance in the detectable state illustrated in FIG. 11A.

As described, according to the present embodiment, the X-direction clearance and the Z-direction clearance of the detection unit 299 is set by the base holder 303. That is, the support member is configured to allow movement of the detection unit in a third direction orthogonal to the first direction, and further configured to allow movement of the detection unit in the second direction. Then, the range in which the support member allows the detection unit to move in the second direction in a state where the detection unit is positioned at the second position is narrower than the range in which the support member allows the detection unit to move in the second direction in a state where the detection unit is positioned at the first position.

In the detectable state, the position of the detection unit 299 in the X and Z directions is determined based on the toner cartridge T by the fitting of the positioning bosses 301_s_ in the positioning holes 61. Therefore, by widening the X-direction clearance and the Z-direction clearance in the detectable state, the possibility of the positioning of the detection unit 299 being obstructed by interference of the base holder 303 may be reduced.

Meanwhile, the X-direction clearance and the Z-direction clearance in the retracted state is smaller than those in the detectable state. Therefore, it becomes possible to prevent the X-direction position or the Z-direction position of the detection unit 299 from being deviated greatly in the retracted state. Further, it becomes possible to reduce the possibility of occurrence of operation failures when the detection unit 299 is transited from the retracted state to the detectable state, and to realize a more stable operation.

Third Embodiment

An image forming apparatus according to a third embodiment will be described with reference to FIGS. 12A, 12B, 13A, and 13B. According to the present embodiment, a portion of a detection unit assembly 398 differs from the detection unit assembly 198 according to the first embodiment. Hereafter, unless denoted otherwise, the elements denoted with the same reference numbers as those of the first embodiment have approximately a same configuration and function as those illustrated in the first embodiment, and the parts that differ from the first embodiment will mainly be described.

Detection Unit

Figure 12B:
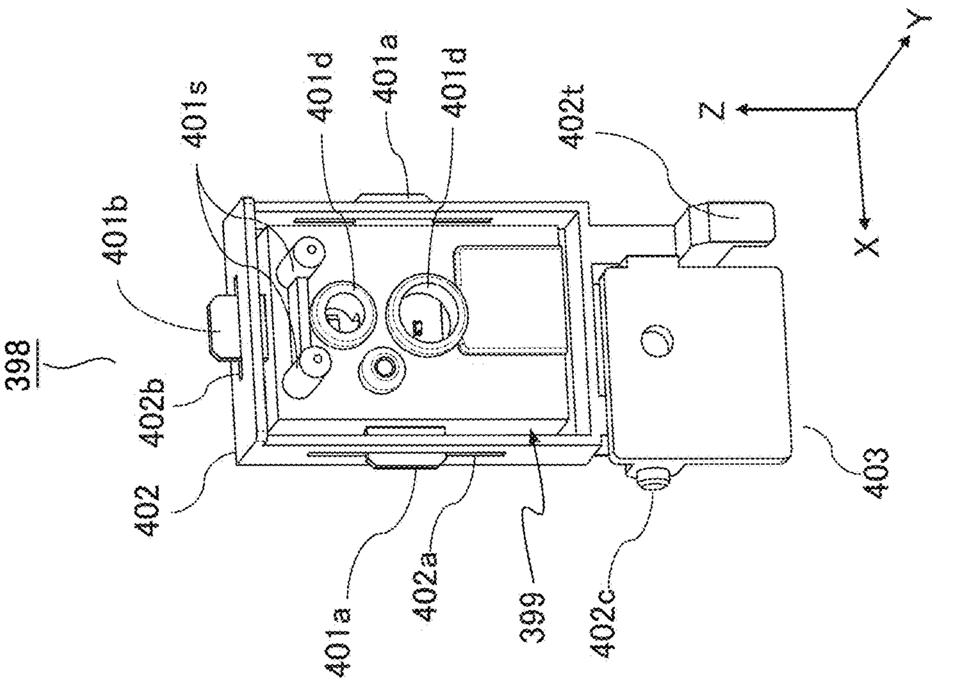
FIG. 12B is a perspective view of the detection unit assembly according to the third embodiment.
Figure 12A:
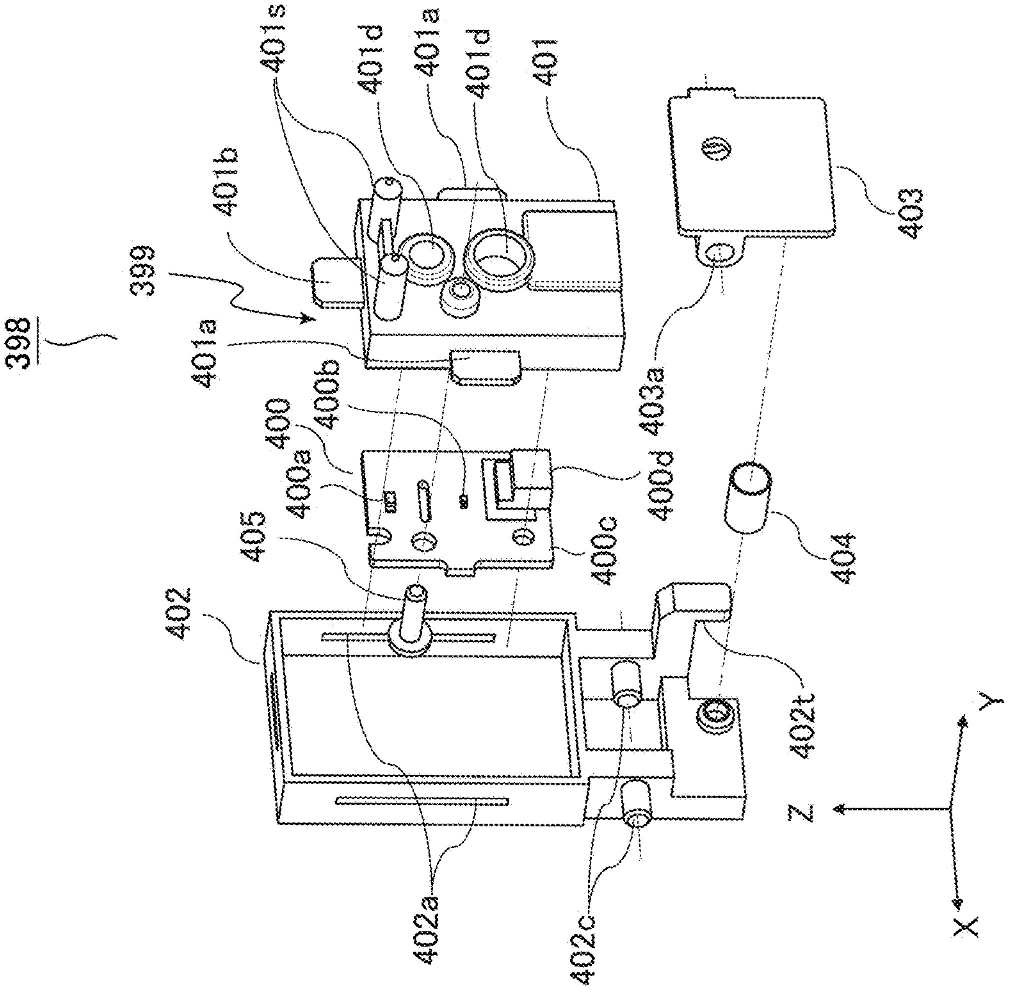
FIG. 12A is an exploded view of a detection unit assembly according to a third embodiment.

The configuration of the detection unit assembly 398 will be described with reference to FIGS. 12A and 12B. FIG. 12A is an exploded view of the detection unit assembly 398. FIG. 12B is a perspective view of the detection unit assembly 398. As illustrated in FIGS. 12A and 12B, the detection unit assembly 398 includes a detection unit 399 composed of a sensor substrate 400 and a substrate holder 401, a swing holder 402, a base holder 403, and a compression spring 404.

The sensor substrate 400 includes a light emitting portion 400_a_, a light receiving portion 400_b_, an insulating substrate 400_c_, and a connector 400_d_. The sensor substrate 400 is fixed to the substrate holder 401 by a screw 405, and moves integrally with the substrate holder 401. The detection unit 399 including the sensor substrate 400 and the substrate holder 401 is movable to a detectable position, i.e., first position, and a retracting position, i.e., second position, retracted in the −Y direction from the detectable position.

The substrate holder 401 includes positioning bosses 401_s_ that protrude in the +Y direction, first ribs 401_a_ that protrude in the X direction, a second rib 401_b_ that protrudes in the Z direction, and optical path holes 401_d_. The substrate holder 401 according to the present embodiment includes two positioning bosses 401_s_, two first ribs 401_a_, one second rib 401_b_, and two optical path holes 401_d_.

One of the optical path holes 401_d_ faces the light emitting portion 400_a_. The other of the optical path holes 401_d_ faces the light receiving portion 400_b_. When the toner cartridge T is attached to the apparatus body 100A, the light emitting portion 400_a_ and the light receiving portion 400_b_ face the incident portion 112_a_ and the emitting portion 113_a_ (FIG. 4) of the light guide member 110 through the optical path holes 401_d_.

The positioning bosses 401_s_ have positioning shapes for positioning the sensor substrate 400 on the toner cartridge T when the toner cartridge T is attached to the apparatus body 100A. The positioning bosses 401_s_ are an example of a positioned portion that is engaged with the positioning portion of the toner cartridge T. Further, the positioning bosses 401_s_ are an example of a projecting portion that is engaged with the positioning holes 61 serving as the hole portion. The positioning bosses 401_s_ are protruded in the +Y direction from the end face in the +Y direction of the substrate holder 401. The positioning bosses 401_s_ are preferably arranged in the vicinity of the optical path holes 401_d_.

The first ribs 401_a_ are fit slidably in the Z direction to first slits 402_a_ of the swing holder 402. One of the first ribs 401_a_ is projected in the +X direction from an end face in the +X direction of the substrate holder 401 and is extended in the Z direction. The other of the first ribs 401_a_ is projected in the −X direction from an end face in the −X direction of the substrate holder 401 and is extended in the Z direction.

The second rib 401_b_ is fit slidably in the X direction to a second slit 402_b_ of the swing holder 402. The second rib 401_b_ protrudes in the +Z direction from an end face in the +Z direction of the substrate holder 401 and is extended in the X direction.

The base holder 403 is an example of a support member. The base holder 403 is fixed to the left side plate 250 of the apparatus body 100A. The base holder 403 includes a support hole 403_a_ that supports the swing holder 402 swingably.

The swing holder 402 is an example of a swing member. The swing holder 402 includes the first slits 402_a_, the second slit 402_b_, a rotation shaft 402_c_, and a hook portion 402_t_. The swing holder 402 is approximately box-shaped that is opened to the +Y direction side, and accommodates the detection unit 399 therein. The swing holder 402 is swingable on an X-direction axis about the rotation shaft 402*c* fit to the support hole 403*a* of the base holder 403. The hook portion 402*t* is a force receiving portion that receives force from an interlocking mechanism 470 that is interlocked with the opening of the door 275.

The first slits 402*a* are provided with a Z-direction clearance with respect to the first ribs 401*a*. Further, the second slit 402*b* is provided with an X-direction clearance with respect to the second rib 401*b*. Therefore, the detection unit 399 is movable in the X direction and the Z direction with respect to the swing holder 402. Meanwhile, the Y-direction widths of the first slits 402*a* and the second slit 402*b* are set so that the detection unit 399 does not substantially move in the Y direction with respect to the swing holder 402. Further, when the swing holder 402 swings about the rotation shaft 402*c*, the detection unit 399 swings together with the swing holder 402.

The compression spring 404 is an example of an urging member that urges the detection unit 399. The compression spring 404 according to the present embodiment is arranged to urge the detection unit 399 in the +Y direction. Specifically, the compression spring 404 according to the present embodiment is arranged between the swing holder 402 and the base holder 403 in the −Z direction side of the rotation shaft 402*c* of the swing holder 402. The compression spring 404 is fixed by being press-fit to a projected portion disposed on the +Y-direction side surface of the swing holder 402, and the other end thereof is supported by a projected portion disposed on the base holder 403. By having the compression spring 404 urge the swing holder 402 in the −Y direction on the −Z-direction side of the rotation shaft 402*c*, the detection unit 399 retained at the +Z-direction side of the rotation shaft 402*c* is urged in the +Y direction. Further, a spring member other than the compression spring or an elastomer may be used as the urging member.

In the present embodiment, the swing holder 402 is supported by the base holder 403, but the present technique is not limited thereto, and for example, a configuration can be adopted in which the swing holder 402 is supported swingably by a bearing portion disposed on the left side plate 250.

The interlocking mechanism 270 according to the present embodiment has approximately a same configuration as the first embodiment, excluding the point that the pressing portion 271*a* of the first link 271 presses the hook portion 402*t* of the swing holder 402.

Figure 13A:
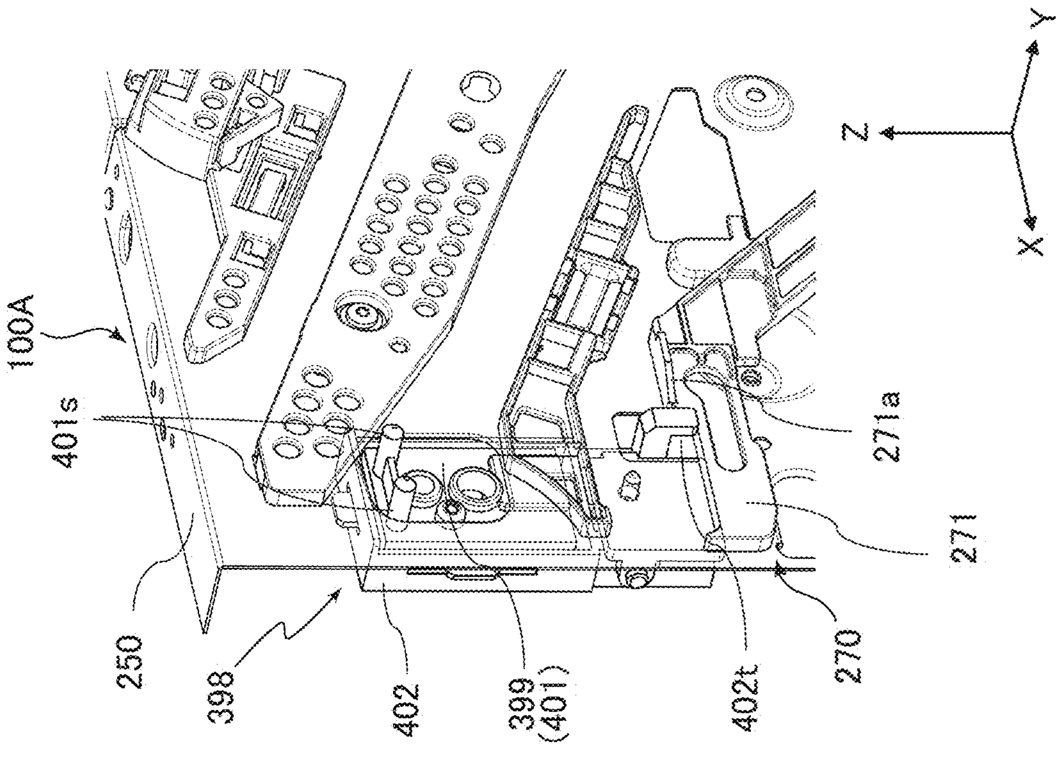
FIGS. 13A and 13B are each an explanatory view illustrating an operation of an apparatus according to the third embodiment.
Figure 13B:
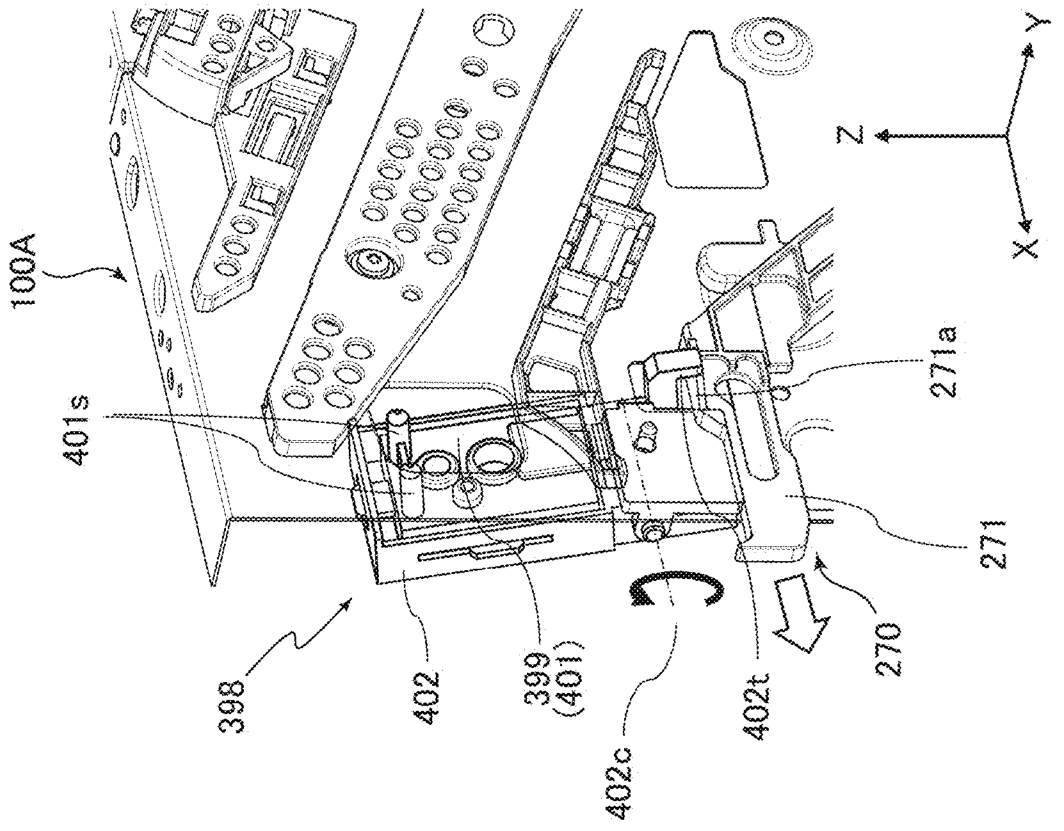

The operation of opening and closing of the door 275 will be described with reference to FIGS. 13A and 13B. FIG. 13A is a view illustrating a portion of the apparatus body 100A when the door 275 is at the closed position. FIG. 13B is a view illustrating a portion of the apparatus body 100A when the door 275 is at the opened position.

As illustrated in FIG. 13A, when the door 275 is at the closed position, the first link 271 is at the −X-direction side position. In this state, the pressing portion 271*a* of the first link 271 is not in contact with the hook portion 402*t* of the swing holder 402. Therefore, the swing holder 402 is at a position pivoted by the urging force of the compression spring 404, and the detection unit 399 is positioned at the +Y-direction side position. That is, when the door 275 is at the closed position, the detection unit 299 is positioned at the detectable position.

In the detectable state, the positioning bosses 401*s* are protruded in the +Y direction with respect to the left side plate 250. When the door 275 is at the closed position with the toner cartridge T attached to the apparatus body 100A, the positioning bosses 401*s* fit to the positioning holes 61 on the side cover 60 of the toner cartridge T. Thereby, the position of the detection unit 399 in the X and Z directions is determined based on the positioning holes 61 of the toner cartridge T. That is, the positioning accuracy of the light emitting portion 400*a* and the light receiving portion 400*b* with respect to the light guide member 110 may be improved, and a more stable detection accuracy of the amount of waste toner may be realized.

The position of the detection unit 399 in the Y direction is determined by the substrate holder 401 being pressed against the left side plate 250.

When the door 275 is opened from the state of FIG. 13A, the first link 271 slides in the +X direction via the second link 272. Then, as illustrated in FIG. 13B, the pressing portion 271*a* of the first link 271 presses the hook portion 402*t* of the swing holder 402, and causes the swing holder 402 to swing against the urging force of the compression spring 404. Thereby, the detection unit 399 moves in the −Y direction, and the positioning bosses 401*s* are disengaged in the −Y direction from the positioning holes 61.

As described, the interlocking mechanism 470 moves the detection unit 399 from the detectable position, i.e., first position, to the retracting position, i.e., second position, in an interlocked manner with the operation of opening the door 275. That is, the interlocking mechanism 470 moves the substrate holder 401 to the opposite direction, i.e., −Y direction, as the projecting direction, i.e., +Y direction, of the positioning bosses 401*s* in an interlocked manner with the operation of opening the door 275, and causes the positioning bosses 401*s* to be retracted from the positioning holes 61. Thereby, when the door 275 is at the opened position, the user may insert or remove the toner cartridge T without having the positioning bosses 401*s* of the apparatus body 100A interfere with the positioning holes 61 of the toner cartridge T.

When the door 275 is closed from the state illustrated in FIG. 13B, the first link 271 slides in the +X direction via the second link 272. Then, the hook portion 402*t* of the swing holder 402 is released from the pressing portion 271*a* of the first link 271, such that the swing holder 402 swings by the urging force of the compression spring 404. Thereby, the detection unit 399 moves in the Y direction. By the movement of the substrate holder 401 in the +Y direction, the positioning bosses 401*s* protrude in the +Y direction with respect to the left side plate 250 and fits to the positioning holes 61 of the toner cartridge T. Thereby, the position of the detection unit 399 in the X and Z directions is determined based on the positioning holes 61 of the toner cartridge T.

As described, the interlocking mechanism 470 causes the detection unit 399 to move from the retracting position, i.e., second position, to the detectable position, i.e., first position, in an interlocked manner with the operation of closing the door 275. That is, the interlocking mechanism 470 causes the substrate holder 401 to move in the projecting direction, i.e., +Y direction, of the positioning bosses 401*s* in an interlocked manner with the operation of closing the door 275, and causes the positioning bosses 401*s* to fit to the positioning holes 61. Thereby, when the user closes the door 275 after attaching the toner cartridge T to the apparatus body 100A, a state in which the detection unit 399 is positioned on the toner cartridge T may be realized.

As described, according to the present embodiment, an image forming apparatus capable of realizing both the workability of attachment and detachment of the attachable/ detachable unit and the positioning accuracy of the detection unit 399 serving as the interface unit may be provided.

Modified Example

In the first embodiment, a configuration regarding a detection unit for detecting the amount of water toner has been illustrated as an example of the interface unit disposed on the apparatus body side with respect to the attachable/detachable unit capable of being attached to and detached from the apparatus body of the image forming apparatus. The example of the interface unit is not limited thereto.

Figure 14:
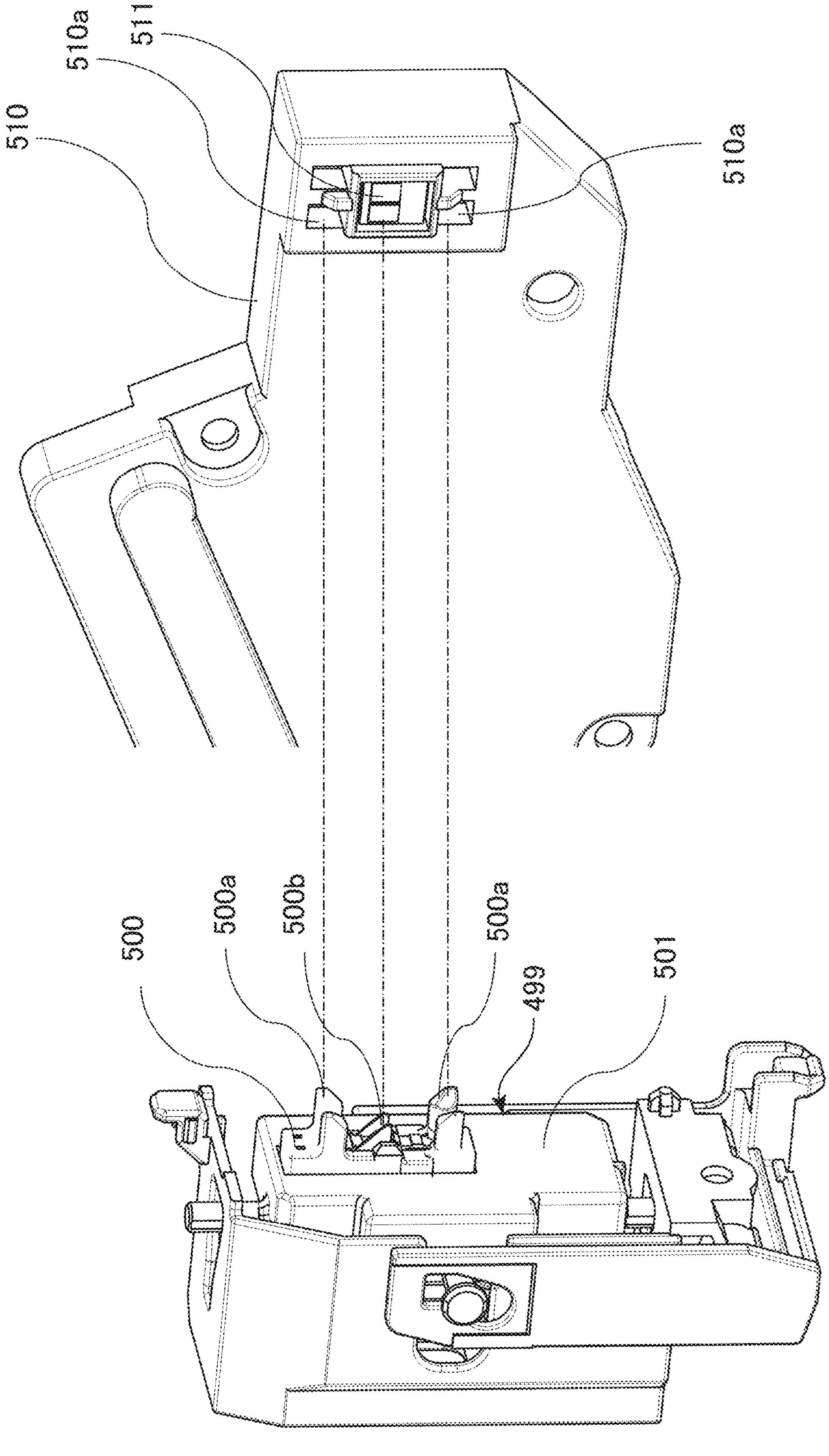
FIG. 14 is a view illustrating a contact unit assembly according to a modified example.

For example, as illustrated in FIG. 14, the present technique may be applied to a contact unit 499 for acquiring information from a storage medium, i.e., memory tag, attached to a cartridge. The cartridge may be a toner cartridge T or a process cartridge P. In the present modified example, the contact unit 499 includes a tag connector 500 and a connector holder 501. A configuration of the detection unit assembly similar to the embodiments described above may be applied by replacing the detection unit with the contact unit 499.

The tag connector 500 includes positioning bosses 500*a* and body contact portions 500*b*. The tag connector 500 is fixed to the connector holder 501 and moves integrally therewith. The positioning bosses 500*a* have positioning shapes, i.e., engaged portions, projected in the +Y direction. The positioning bosses 500*a* are an example of a positioned portion that is engaged with a positioning portion of the toner cartridge T. The connector holder 501 may move in the Y direction and has clearances in the X and Z directions set according to a similar configuration as a supporting configuration of the substrate holder according to the embodiments described above.

Meanwhile, a side cover 510 of the cartridge includes positioning holes 510*a* and a tag substrate 511 serving as a storage medium, i.e., memory tag. The positioning holes 510*a* are an example of a positioning portion, i.e., hole portion or first hole portion that receives the projecting portion, to be engaged with the positioning bosses 500*a*. The tag substrate 511 includes a memory chip that stores information, and has an electric contact surface exposed toward an outer side of the cartridge. The information stored in the memory chip may be, for example, a cartridge model type, an individual identification number, a production lot, and an amount of toner stored in the interior thereof. By having the tag connector 500 of the contact unit 499 come into contact with a contact surface of the tag substrate 511, the control unit 109 (FIG. 1) of the apparatus body 100A is electrically connected to the tag substrate 511, and the control unit 109 may acquire information from the tag substrate 511.

According to the interlocking mechanism similar to those of the embodiments described above, the tag connector 500 and the connector holder 501 move in the +Y direction in an interlocked manner with the operation of opening the door 275. That is, the contact unit 499 moves from the retracting position to the detectable position in an interlocked manner with the operation of opening the door 275. Thereby, the positioning bosses 500*a* fit to each of the positioning holes 510*a*, and the positions of the tag connector 500 and the connector holder 501 in the X and Z directions are determined based on the cartridge. Thereby, the body contact portions 500*b* may be made to come into contact with and electrically conducted with the tag substrate 511 in a more reliable manner.

Further, the tag connector 500 and the connector holder 501 are moved in the −Y direction in an interlocked manner with the operation of closing the door 275. That is, the contact unit 499 moves from the detectable position to the retracting position in an interlocked manner with the operation of closing the door 275. Thereby, the positioning bosses 500*a* are respectively disengaged from the positioning holes 510*a*. When the door 275 is at the opened position, the user may insert and remove the cartridge without having positioning bosses 500*a* of the apparatus body 100A interfere with the positioning holes 510*a* of the cartridge.

As described, according to the present modified example, an image forming apparatus capable of realizing both the workability of attachment and detachment of the attachable/detachable unit and the positioning accuracy of the contact unit 499 serving as the interface unit may be provided.

Other Examples

In the respective embodiments described above, examples have been illustrated of a case where the shapes of the positioning bosses 201*s*, 301*s*, 401*s*, and 500*a* serving as the positioned portion disposed on the apparatus body 100A are protruded in the first direction, i.e., Y direction. That is, examples have been illustrated where the positioned portions are projecting portions protruded in the first direction. The present technique is not limited thereto, and the positioning portion disposed on the attachable/detachable unit may be a projecting portion that is protruded in the first direction. In this case, the positioned portion may be a hole portion which may be engaged with the positioning portion serving as the projecting portion to determine the position of the detection unit or the contact unit with respect to the attachable/detachable unit when viewed in the first direction, i.e., Y direction. Specifically, for example, positioning bosses that protrude in the −Y direction may be disposed instead of the positioning holes 61 of the embodiments, and positioning holes that open to the +Y direction may be disposed instead of the positioning bosses 201*s* of the present embodiment.

The detection unit according to the respective embodiments and the contact unit 499 described above are mere examples of an interface unit, and other detection mechanisms may be adopted. For example, it may be a detection unit that detects the amount of fresh toner within the toner supply unit 30 of the toner cartridge T. Further, it may be a detection unit that detects the amount of toner within the developing unit 15 of the process cartridge P. Further, the method for detecting the amount of content, i.e., toner or waste toner, within the cartridge is not limited to the light-transmission-type detection mechanism described in the respective embodiments, and a known electrostatic capacity-type or permeability detection-type sensor may be adopted.

Further, the attachable/detachable unit that may be attached to and detached from the apparatus body is not limited to the process cartridge P and the toner cartridge T. For example, the attachable/detachable unit may be a collecting container, i.e., waste toner container, that collects waste toner having been collected from the photosensitive drum, the collecting container capable of being attached to and detached from the apparatus body independently from the toner cartridge T. Further, the attachable/detachable unit may be an intermediate transfer belt unit. An intermediate transfer belt unit is a unit in which an intermediate transfer belt and a plurality of rollers across which the intermediate transfer belt is stretched are integrally disposed in an intermediate transfer-type image forming apparatus for forming an image on a recording material from the photosensitive drum through the intermediate transfer belt serving as an intermediate transfer body.

As described above, according to the present disclosure, a new technique related to an image forming apparatus having an attachable/detachable unit that may be attached to and detached from the apparatus body may be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-107475, filed on Jun. 29, 2023, which is hereby incorporated by reference herein in its entirety.

What is claimed is:

1. An image forming apparatus comprising:

an apparatus body provided with an opening portion; and an attachable/detachable unit configured to be attached to and detached from the apparatus body through the opening portion, wherein the apparatus body includes (i) an opening/closing member configured to move between a closed position in which the opening/closing member closes the opening portion and an opened position in which the opening/closing member opens the opening portion, (ii) a detection unit configured to detect a state of the attachable/detachable unit, the detection unit being disposed to face an end face of the attachable/detachable unit in a first direction in a state where the attachable/detachable unit is attached to the apparatus body, the first direction being a direction intersecting an attachment direction of the attachable/detachable unit to the apparatus body, (iii) a movement member configured to move the detection unit between a first position and a second position in the first direction and to allow a movement of the detection unit with respect to the movement member, (iv) a restricting member configured to restrict, to a first range, a movement of the detection unit with respect to the movement member in a second direction intersecting the first direction, and (v) an interlocking mechanism configured to move the movement member in an interlocked manner with a movement of the opening/closing member, wherein the attachable/detachable unit includes a positioning portion disposed on the end face, wherein the detection unit includes a positioned portion configured to be engaged with the positioning portion such that a position of the detection unit with respect to the attachable/detachable unit on a plane perpendicular to the first direction is determined, wherein one of the positioned portion and the positioning portion is a projecting portion that projects in the first direction, and the other of the positioned portion and the positioning portion is a first hole portion configured to be engaged with the projecting portion, wherein the first position is a position in which the positioned portion is engaged with the positioning portion, and the second position is a position in which the positioned portion is disengaged from the positioning portion, wherein the interlocking mechanism is configured such that the movement member moves the detection unit from the first position to the second position in a case where the opening/closing member is moved from the closed position to the opened position, and such that the movement member moves the detection unit from the second position to the first position in a case where the opening/closing member is moved from the opened position to the closed position, and wherein the restricting member is configured such that the first range in a state where the detection unit is positioned at the second position is narrower than the first range in a state where the detection unit is positioned at the first position.

2. The image forming apparatus according to claim 1, wherein the movement member is a swing member that is swingable such that the detection unit is moved between the first position and the second position, and wherein the interlocking mechanism is configured to swing the swing member in an interlocked manner with the movement of the opening/closing member.

3. The image forming apparatus according to claim 1, wherein the detection unit includes a protruding portion that protrudes in the second direction, wherein the movement member includes a second hole portion into which the protruding portion is inserted, wherein a width of the second hole portion in a third direction intersecting both the first direction and the second direction is greater than a width of the protruding portion in the third direction, wherein a rim of the second hole portion includes a concave shape that positions the protruding portion in the third direction by coming into contact with the protruding portion in a state where the detection unit is positioned at the second position, and wherein the protruding portion is not in contact with the concave shape in a state where the detection unit is positioned at the first position.

4. The image forming apparatus according to claim 1, further comprising:

an urging member configured to urge the detection unit toward the first position, wherein the interlocking mechanism includes a link member configured to be interlocked with an opening and closing operation of the opening/closing member, and wherein the link member includes a pressing portion configured to press the movement member such that the movement member moves the detection unit toward the second position against an urging force of the urging member when the opening/closing member is moved from the closed position to the opened position.

5. The image forming apparatus according to claim 1, further comprising:

an urging member configured to urge the detection unit toward the second position, wherein the interlocking mechanism includes a link member configured to be interlocked with an opening and closing operation of the opening/closing member, and wherein the link member includes a pressing portion configured to press the movement member such that the movement member moves the detection unit toward the first position against an urging force of the urging member when the opening/closing member is moved from the opened position to the closed position.

6. The image forming apparatus according to claim 1, wherein the detection unit includes a protruding portion that protrudes in a third direction intersecting both the first direction and the second direction, wherein the restricting member includes a second hole portion into which the protruding portion is inserted, and wherein a width of the second hole portion in the second direction at a position of the protruding portion in the first direction in a state where the detection unit is positioned at the second position is narrower than a width of the second hole portion in the second direction at a position of the protruding portion in the first direction in a state where the detection unit is positioned at the first position.

7. The image forming apparatus according to claim 1, wherein the restricting member is further configured to restrict, to a second range, a movement of the detection unit in a third direction intersecting both the first direction and the second direction, and wherein the second range in the state where the detection unit is positioned at the second position is narrower than the second range in the state where the detection unit is positioned at the first position.

8. The image forming apparatus according to claim 1, wherein the positioned portion is the projecting portion, and wherein the positioning portion is the first hole portion into which the projecting portion is inserted.

9. The image forming apparatus according to claim 8, wherein the apparatus body includes a side plate on which a second hole portion is disposed, the side plate being arranged on one side in the first direction with respect to the attachable/detachable unit and extending in a direction intersecting the first direction, wherein the detection unit is attached to the one side in the first direction of the side plate, and wherein the projecting portion is inserted into the second hole portion and protrudes from the one side to the other side in the first direction with respect to the side plate in a state where the detection unit is at the first position.

10. The image forming apparatus according to claim 1, wherein the attachable/detachable unit includes a storage portion configured to store toner or waste toner, and wherein the detection unit includes a light emitting portion that emits light, and a light receiving portion that is configured to receive light having passed through an inner space of the storage portion and that outputs a detection signal corresponding to an amount of light.

11. The image forming apparatus according to claim 10, wherein a projecting direction of the projecting portion is parallel to an optical axis direction of the light emitting portion.

12. The image forming apparatus according to claim 10, wherein the detection unit includes a sensor substrate including the light emitting portion and the light receiving portion, and a substrate holder configured to retain the sensor substrate and to move integrally with the sensor substrate, wherein the attachable/detachable unit includes a first light guide body that is configured to guide light from the light emitting portion to the inner space of the storage portion, a second light guide body that is configured to guide light having passed through the inner space of the storage portion to the light receiving portion, and a cover member on which are formed a first opening to which the first light guide body is inserted and a second opening to which the second light guide body is inserted, wherein the positioned portion is disposed on the substrate holder, and wherein the positioning portion is disposed on the cover member.

13. An image forming apparatus comprising:
an apparatus body provided with an opening portion; and
an attachable/detachable unit configured to be attached to and detached from the apparatus body through the opening portion, the attachable/detachable unit including a storage medium configured to store information related to the attachable/detachable unit,
wherein the apparatus body includes
(i) an opening/closing member configured to move between a closed position in which the opening/closing member closes the opening portion and an opened position in which the opening/closing member opens the opening portion,
(ii) a control unit configured to acquire information from the storage medium,
(iii) a contact unit electrically connected with the control unit and configured to electrically contact the storage medium in a state where the attachable/detachable unit is attached to the apparatus body, the contact unit being disposed to face an end face of the attachable/detachable unit in a first direction in a state where the attachable/detachable unit is attached to the apparatus body, the first direction being a direction intersecting an attachment direction of the attachable/detachable unit to the apparatus body, and
(iv) an interlocking mechanism configured to move the contact unit in an interlocked manner with a movement of the opening/closing member,
wherein the attachable/detachable unit includes a positioning portion disposed on the end face,
wherein the contact unit includes a positioned portion that is configured to be engaged with the positioning portion such that a position of the contact unit with respect to the attachable/detachable unit on a plane perpendicular to the first direction is determined,
wherein one of the positioned portion and the positioning portion is a projecting portion that projects in the first direction, and the other of the positioned portion and the positioning portion is a first hole portion configured to be engaged with the projecting portion,
wherein the contact unit is configured to move between a first position in which the positioned portion is engaged with the positioning portion and a second position in which the positioned portion is disengaged from the positioning portion, and
wherein the interlocking mechanism is configured to move the contact unit from the first position to the second position in a case where the opening/closing member is moved from the closed position to the opened position, and to move the contact unit from the second position to the first position in a case where the opening/closing member is moved from the opened position to the closed position.

14. The image forming apparatus according to claim 13, wherein the apparatus body includes a movement member configured to move the contact unit between the first position and the second position in the first direction, and to allow a movement of the contact unit with respect to the movement member in a second direction intersecting the first direction, wherein the interlocking mechanism is configured to move the movement member in an interlocked manner with the movement of the opening/closing member.

15. The image forming apparatus according to claim 14, wherein the apparatus body includes a restricting member configured to restrict, to a range, a movement of the contact unit with respect to the movement member in the second direction, and wherein the range in a state where the contact unit is positioned at the second position is narrower than the range in a state where the contact unit is positioned at the first position.

16. The image forming apparatus according to claim 14, further comprising:

an urging member configured to urge the contact unit toward the first position, wherein the interlocking mechanism includes a link member configured to move in an interlocked manner with an opening and closing operation of the opening/closing member, and wherein the link member includes a pressing portion configured to press the movement member and to move the movement member toward the second position against an urging force of the urging member when the opening/closing member is moved from the closed position to the opened position.

17. The image forming apparatus according to claim 14, further comprising:

an urging member configured to urge the contact unit toward the second position, wherein the interlocking mechanism includes a link member configured to move in an interlocked manner with an opening and closing operation of the opening/closing member, and wherein the link member includes a pressing portion configured to press the movement member such that the movement member moves the contact unit toward the first position against an urging force of the urging member when the opening/closing member is moved from the opened position to the closed position.

18. The image forming apparatus according to claim 13, wherein the positioned portion is the projecting portion, and wherein the positioning portion is the first hole portion into which the projecting portion is inserted.

19. The image forming apparatus according to claim 13, wherein the apparatus body includes a side plate on which a second hole portion is disposed, the side plate being arranged on one side in the first direction with respect to the attachable/detachable unit and extending in a direction intersecting the first direction, wherein the contact unit is attached to the one side in the first direction of the side plate, and wherein the projecting portion is inserted into the second hole portion and protrudes from the one side to the other side in the first direction with respect to the side plate in a state where the contact unit is at the first position.

* * * * *